United States Patent
Nutaro et al.

(10) Patent No.: US 9,417,629 B2
(45) Date of Patent: Aug. 16, 2016

(54) GROUND REMOTE CONTROL SYSTEM AND METHOD FOR AN AIRCRAFT WITH AN ELECTRIC TAXI SYSTEM

(71) Applicant: HONEYWELL INTERNATIONAL INC., Morristown, NJ (US)

(72) Inventors: Joseph Nutaro, Phoenix, AZ (US);
William D. Cromer, Gilbert, AZ (US);
Daniel P. Johnson, Fridley, MN (US);
Lee Davis, Litchfield Park, AZ (US);
James Fusaro, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 0 days.

(21) Appl. No.: 14/532,443

(22) Filed: Nov. 4, 2014

(65) Prior Publication Data
US 2016/0124428 A1 May 5, 2016

(51) Int. Cl.
*G05D 1/00* (2006.01)
*B64C 25/40* (2006.01)
*B64C 25/42* (2006.01)
*B64C 25/50* (2006.01)

(52) U.S. Cl.
CPC ............ *G05D 1/0011* (2013.01); *B64C 25/405* (2013.01); *B64C 25/42* (2013.01); *B64C 25/50* (2013.01)

(58) Field of Classification Search
CPC ... B60W 10/08; B64C 25/405; G05D 1/0022; G08G 5/065
See application file for complete search history.

(56) References Cited

U.S. PATENT DOCUMENTS

| | | | |
|---|---|---|---|
| 7,975,960 B2 | 7/2011 | Cox et al. | |
| 2006/0065779 A1 | 3/2006 | McCoskey et al. | |
| 2011/0089289 A1* | 4/2011 | Wilson | B64C 25/405 244/50 |
| 2012/0168557 A1 | 7/2012 | Edelson et al. | |

FOREIGN PATENT DOCUMENTS

EP 02551192 A2 1/2013

* cited by examiner

*Primary Examiner* — Michael D Lang
(74) *Attorney, Agent, or Firm* — Shimokaji IP

(57) ABSTRACT

A ground remote control system for an aircraft includes a security pairing device configured to establish a first secure communication link and protocol between a remote control device and a ground remote control system controller; and establish a second secure communication link and protocol, using the first communication link and protocol between the remote control device and the ground remote control system controller. The ground remote control system controller is configured to receive drive command signals, brake command signals, steering command signals, and power command signals, from the remote control device and generate the electronic drive commands, the electronic brake commands, the electronic steering commands, and the electronic power commands.

18 Claims, 30 Drawing Sheets

GROUND REMOTE CONTROL SYSTEM AND METHOD FOR AN AIRCRAFT WITH AN ELECTRIC TAXI SYSTEM

BACKGROUND OF THE INVENTION

The present invention generally relates to apparatus and methods for remotely controlling an aircraft with an electric taxi system (ETS) while the aircraft is on the ground and allowing remote start and control of other selected systems.

Traditionally, repositioning an aircraft on the ground at an airport for maintenance, or other reasons, unrelated to taxiing, requires at least one crew member in the flight deck, as well as a ground crew outside the aircraft. The ground crew generally gives guidance to the flight deck operator and may operate a tug when the aircraft's main engines are not used.

When an aircraft includes an ETS for providing motive power to the aircraft during taxiing, the ETS may also be used to reposition the aircraft at an airport. A trained and qualified maintenance crew member may be positioned in the flight deck to operate the ETS, while one or two others on the ground, guide the aircraft and to make sure the wings do not clip ground objects or other aircraft.

A remote control system for operating the ETS and other aircraft systems may reduce the number of people needed to reposition an aircraft at the airport. However, security must be maintained for such a system and proper controls provided for safe aircraft operation.

As can be seen, there may be an ongoing need for remote control guidance systems to operate an aircraft with ETS in a secure and safe manner.

SUMMARY OF THE INVENTION

In one aspect of the present invention, a ground remote control system for an aircraft, comprises an electric taxi system to provide motive power for taxiing the aircraft in response to electronic drive commands; a braking system to slow the aircraft during taxiing in response to electronic brake commands; a steering system to steer the aircraft during taxiing in response to electronic steering commands; a security pairing device configured to establish a first secure communication link and protocol between a remote control device and a ground remote control system controller located on the aircraft; and establish a second secure communication link and protocol, using the first communication link and protocol between the remote control device and the ground remote control system controller; the ground remote control system controller configured to receive a desired speed and direction, braking input signals, and a desired steering angle, from the remote control device, using the second secure communication link and protocol; and generate the electronic drive commands, the electronic brake commands, and the electronic steering commands, based, at least in part, on the desired speed and direction, the braking input signals, and the desired steering angle.

In another aspect of the present invention, a ground remote control method for an aircraft comprises receiving a request to allow remote control of the aircraft with a remote control device; inputting a request for a first security code and a second security code to be sent to the remote control device with an input device on the aircraft; generating the first security code and the second security code with a ground remote control system controller on the aircraft; displaying the first security code on a first security code display on the aircraft; transmitting the first security code and the second security code to the remote control device through a first communication link and protocol; receiving a confirmation security code through the first communication link and protocol; displaying the third security code on a second security code display on the aircraft; inputting a remote control on input through a remote control selector on the aircraft if the first security code equals the confirmation security code; establishing a second secure communication link and protocol, between the remote control device and the ground remote control system using the second security code; receiving with the ground remote control system controller a desired speed and direction, braking input signals, and a desired steering angle, from the remote control device, using the second secure communication link and protocol; and generating with the ground remote control system controller electronic drive commands, electronic brake commands, and electronic steering commands, based, at least in part, on the desired speed and direction, the braking input signals, and the desired steering angle.

In yet another aspect of the present invention, a ground remote control system for an aircraft comprises an air conditioning system configured to turn on and turn off in response to electronic air conditioning system power commands; a heating system configured to turn on and turn off in response to electronic heating system power commands; an auxiliary power unit selectively connected to the air conditioning system and the heating system to provide power to the air conditioning system and the heating system; the auxiliary power unit configured to power on and power off in response to electronic power commands; and a security pairing device configured to establish a first secure communication link and protocol between a remote control device and a ground remote control system controller; and establish a second secure communication link and protocol, using the first communication link and protocol between the remote control device and the ground remote control system controller; the ground remote control system controller configured to receive auxiliary power unit power on and power off signals, and an aircraft ready input from the remote control device, using the second secure communication link and protocol; and generate the air conditioning system power commands, the heating system power commands, based, at least in part, on the auxiliary power unit power on and power off signals, and the aircraft ready input.

These and other features, aspects and advantages of the present invention will become better understood with reference to the following drawings, description and claims.

DETAILED DESCRIPTION OF THE INVENTION

The following detailed description is of the best currently contemplated modes of carrying out the invention. The description is not to be taken in a limiting sense, but is made merely for the purpose of illustrating the general principles of the invention, since the scope of the invention is best defined by the appended claims.

Various inventive features are described below that can each be used independently of one another or in combination with other features. However, any single inventive feature may not address any of the problems discussed above or may only address one of the problems discussed above. Further, one or more of the problems discussed above may not be fully addressed by any of the features described below.

The present invention generally provides a remote control system and method for an aircraft with an electric taxi system. In general, when motive power for an aircraft is through an electric taxi system during ground operations at an airport, the aircraft may be moved for maintenance or other reasons with a person on the flight deck and a ground crew. By using a remote control system and method to move the aircraft for other than landing and take-off, such as to a maintenance hangar or to another gate, the operation may be done with fewer personnel.

Figure 1:
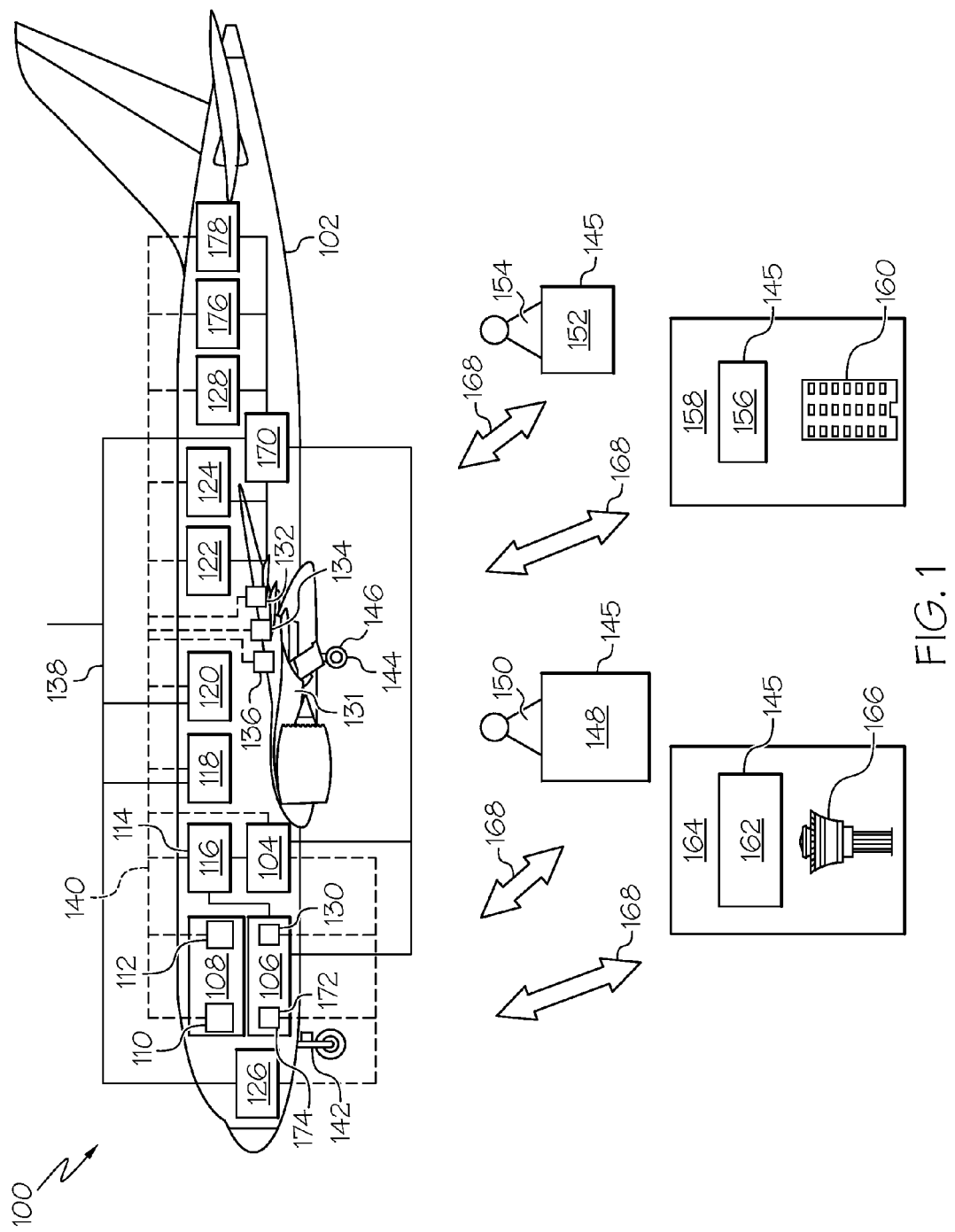
FIG. 1 is a schematic drawing of a ground remote control system for an aircraft with an ETS according to an exemplary embodiment of the present invention.

Referring now to FIG. 1, a schematic drawing illustrates an exemplary ground remote control system 100 for an aircraft 102 with an ETS 118. The system 100 may include the ETS 118, an electronically controlled braking system 120, an electronically controlled steering system 126, an APU 170, a security pairing device (SPD) 106, and a ground remote control system (GRCS) controller 104. The ETS 118 may provide motive power for taxiing the aircraft 102 in response to electronic drive commands. The electronically controlled braking system 120 may be configured to slow the aircraft 102 during taxiing in response to electronic brake commands. The electronically controlled steering system 126 may be configured to steer the aircraft 102 during taxiing in response to electronic steering commands. The APU 170 may selectively connect to the ETS 118, the braking system 120, and the steering system 126 to provide power to the ETS 118, the braking system 120, and the steering system 126. The APU 170 may be configured to power on and power off in response to electronic power commands. The SPD 106 may be configured to establish a first secure communication link and protocol between a remote control device 145 and the GRCS controller 104; and establish a second secure communication link and protocol, using the first communication link and protocol between the remote control device 145 and the GRCS controller 104. The GRCS controller 104 may be configured to receive drive command signals, brake command signals, steering command signals, and power command signals, from the remote control device 145, using the second secure communication link and protocol; and generate the electronic drive commands, the electronic brake commands, the electronic steering commands, and the electronic power commands, based, at least in part, on the drive command signals, the brake command signals, the steering command signals, and the power command signals.

The GRCS controller 104 may include a processor (not shown) and a memory component (not shown). The processor may include microprocessors or other processors as known in the art. In some embodiments the processor may include multiple processors. The GRCS controller 104 may execute instructions, as described below and in relation to FIGS. 5A-5L, 6A-6E, and 7A-7C which may generate commands to aircraft 102 systems in response to signals received from the remote control device 145. In non-limiting examples, the GRCS controller 104 may execute instructions for securely connecting with the remote control device 145 through the SPD 106, moving the aircraft 102 on the ground with the ETS 118, steering the aircraft 102, slowing the aircraft 102 with the braking system 120, turning on and off the APU 170, turning on and off an air conditioning system 122, and turning on and off a heating system 124.

Such instructions may be read into or incorporated into a computer readable medium, such as the memory component, or provided external to processor. The instructions may include multiple lines or divisions of code. The lines or divisions of code may not be consecutive order, and may not be located in the same section of code. In alternative embodiments, hard-wired circuitry may be used in place of or in combination with software instructions as described above, below, or in relation to the drawings.

The term "computer-readable medium" as used herein refers to any non-transitory medium or combination of media that participates in providing instructions to the processor for execution. Such a medium may take many forms, including but not limited to, non-volatile media, volatile media, and transmission media. Non-volatile media includes, for example, optical or magnetic disks. Volatile media includes dynamic memory. Transmission media includes coaxial cables, copper wire and fiber optics.

Although shown as one physical unit, the GRCS controller 104 may include multiple units, or be part of a larger controller unit, as is known in the art. The GRCS controller 104 may be communicatively connected to the SPD 106, an aircraft remote control user interface 110, an aircraft tower communication display 112, the ETS 118, the braking system 120, the air conditioning system 122, the heating system 124, one or more wing cameras 132, one or more wing anti-collision systems 134, one or more remote operation lights 136, the temperature control system 176, and other aircraft systems 128 as is known in the art; through communication links 140; to receive information; and transmit information and commands. The communication links 140 may be physical cable links, such as, for example electrical or optical cables, or may be wireless links. The communication links 140 may use any communication protocols, such as, for example, digital, frequency, and/or analogue communication protocols.

The GRCS controller 104 may be selectively electrically connected to a back-up power supply 114 and the APU 170 through electrical links 138. The back-up power supply 114, which may include, for example, one or more batteries 116, may provide power to the GRCS controller 104 when the APU 170 and/or the aircraft 102 main engines (not shown) are not on.

The SPD 106 may be located on the fuselage of the aircraft 102, for example, near a nose landing gear assembly 142 where portions such as antenna or LED or switches may be easily accessible by a ground crew member 150. The SPD 106 may include a co-located input/output device 130 powered by the GRCS Controller 104, such as a switch, which the ground crew member 150 may use to may enable the GRCS controller 104 to power up through the electrical connection to the back-up power supply 114, and start a process to communicate with the remote control device 145. The input/output device 130 may also be used to power off the SPD 106, ETS 118, and GRCS Controller 104. The co-located input/output device 130 may be in a location easily accessible to the ground crew member 150 outside the aircraft 102. The input/output device 130 may include a warning display such as one or more LEDs which change color to indicate a self test status of the SPD 108, GRCS Controller 104, ETS 118, and various interlocks. The SPD 106 may include an antenna (not shown) communicatively connected to the GRCS controller 104, a modem 172, a memory device (not shown) and/or a processor (not shown). The SPD 106 may include any device including a mechanism which provides for security such as WPA/WPA2, and short range communications to limit access by others to the signals. The short range communications, for example 10 feet may be, for example, magnetic, inductive, and/or RF (such as Blue-tooth). In some embodiments, the SPD 106 may include a port configured to allow a cable connection between the SPD 106 and a remote control device 145 to establish the first communication link. In one embodiment, the modem 170 includes a light emitting diode (LED) modem 174. The LED modem may include a modulated weak LED and an optical system that may direct a signal in a narrow beam that may not be visible away from the aircraft 102. The SPD 106 may be selectively electrically connected to the back-up power supply 114 and the APU 170 through electrical links 138. The back-up power supply 114 may provide power to the SPD 106 when the APU 170 and/or the aircraft 102 main engines (not shown) are not on. The SPD 106 may communicate with the GRCS controller 104 to establish the first secure communication link and protocol between the remote control device 145 and the GRCS controller 104 in the short range communications in which passwords and other identifying elements such as certificates can be exchanged; and using the first communication link and protocol between the remote control device 145 and the GRCS controller 104 establish a second secure communication link and protocol with a longer range, for aircraft control but still reasonably low power to limit transmissiomn distance to near the aircraft; and/or the SPD 106 may separately include the processor and memory component to establish the communication links and protocol. The GRCS controller 104 may be configured to generate unique random numbers each time it powers up. These random numbers may be shared with one or more remote control devices during the establishment of the first communication link as one-time passwords and for futher encryption and authentication.

The aircraft 102 may include a flight deck 108. The aircraft remote control user interface 110, and the aircraft tower communication display 112 (described more fully in relation to FIGS. 2D, 3B, and 4C), may be located in the flight deck 108.

The back-up power supply 114 may be any power storage device configured to be charged by the main engines, the APU 170, or another power source when power is available; and to discharge that power to aircraft 102 devices and systems when needed. In one embodiment the back-up power supply 114 may include one or more batteries 116.

The ETS 118 may be any system which provides motive power to the aircraft 102 through rotating one or more wheels 144 on one or more landing gear assemblies 146. The ETS 118 may include electric motors (not shown) and circuitry and controls to vary the voltage and current to the electric motors to implement drive commands from the GRCS controller 104. The APU 170 may be electrically connected to and may provide power to the ETS 118 during taxiing of the aircraft 102 and other ground maneuvers through power links 138.

The electronically controlled braking system 120 may slow and/or stop the rotation of one or more wheels 144, on one or more landing gear assemblies 142, 146, to slow or stop motion of the aircraft 102 while on the ground. The braking system 120 may slow/or stop the motion of the aircraft 102 in response to and in order to implement braking commands. The braking system 120 may include any braking system known in the art including regenerative braking through electric motors, including the electric motors of the ETS 118. In one embodiment, the braking system 120 may be entirely actuated and powered electrically, with power from the APU 170 or back-up power supply 114 through power links 138. In an alternative embodiment, the braking system 120 may be, at least partially, controlled and actuated with hydraulic power from a pump (not shown) powered by the APU 170 or back-up power supply 114 through power links 138.

The air conditioning system 122, may cool the air inside of at least part of the aircraft 102. The air conditioning system 122 may be powered on and off in response to electronic air conditioning system power commands, which may be generated by the GRSC controller 104. The air conditioning system 122, may cool air to be in a temperature range in response to a temperature control system 176. The heating system 124, may heat the air inside of at least part of the aircraft 102. The heating system 124 may be powered on and off in response to electronic heating system power commands, which may be generated by the GRSC controller 104. The heating system 124, may heat air to be in a temperature range, in response to a temperature control system 176. The temperature control system 176 may control the air conditioning system 122 and the heating system 124 in response to temperature control commands, which may be generated by the GRSC controller 104, to adjust the temperature inside at least part of the aircraft 102 to stay in a desired range. The temperature control system 176 may include, for example, a thermostat. The air conditioning system 122, the heating system 124, and the temperature control system 176 may be electrically connected to, and powered by, the APU 170, and/or the back-up power supply 114 through power links 138.

The electronically controlled steering system 126 may steer the aircraft 102 while on the ground. The steering system 126 may steer the aircraft 102 in response to and in order to implement steering commands. The steering system 126 may include any steering system known in the art including, but not limited to actuating steering mechanism of the nose landing gear assembly 142, or other landing gear assemblies 144, to achieve a desired steering. In one embodiment the steering system 126 may adjust or send drive commands to the electric motors of the ETS 118, such that wheels 146 on one landing gear assembly 144 rotate faster than wheels 146 on another landing gear assembly 144 for proper steering. In one embodiment, the steering system 126 may be entirely actuated and powered electrically, with power from the APU 170 or back-up power supply 114 through power links 138. In an alternative embodiment, the steering system 126 may be, at least partially, controlled and actuated with hydraulic power from a pump (not shown) powered by the APU 170 or back-up power supply 114 through power links 138.

The system 100 may include a fire suppression system 178 communicatively linked to the GRCS controller 104 and powered by the APU 170 and/or back-up power supply 114 through power links 138. The system 100 may also include other aircraft systems 128 which may be controlled through electronic commands from the GRCS controller 104, and powered by the APU 170 and/or back-up power supply 114 through power links 138.

The system 100 may include a wing camera 132 mounted on one or both of the wings 131. The camera 132 may be configured to produce image signals indicative of images of the area surrounding the end of one of the wings 131 such that obstacles that might be hit while the aircraft 102 is in motion may be seen and avoided. The camera 132 may transmit the image signals to the GRCS controller 104. The camera 132 may be powered electrically, with power from the APU 170 or back-up power supply 114 through power links 138. The system may include a wing anti-collision system 134 mounted on one or both of the wings 131, and configured to generate a collision warning signal if one or both of the wings 131 come within a predetermined distance of an obstacle. The collision warning system 134 may transmit the collision warning signal to the GRCS controller 104. The wing anti-collision system 134 may be powered electrically, with power from the APU 170 or back-up power supply 114 through power links 138. The system 100 may include one or more remote operation lights 136 mounted on one or both of the wings 131. The remote operation lights 136 may be configured to turn on in response to a remote control lights on command. The remote operation lights 136 may be powered electrically, with power from the APU 170 or back-up power supply 114 through power links 138.

The system 100 may include one or more remote control devices 145. The remote control devices 145 may, in non-limiting examples, include a ground crew controller (GCC) 148, a ground observer controller (GOC) 152, a flight crew ground controller (FCGC) 156, and/or a remote operations controller (ROC) 162. The remote control devices 145 may be one unit, or they may be part of a larger unit, such as a laptop computer or electronic tablet. The GCC 148 may be used by a member of the ground crew 150 walking beside or near the aircraft and using the GCC 148 to move the aircraft 102 to another location. The GCC 148 may be wirelessly and communicatively connected to the GRCS controller 104 through the SPD 106 through communicative link 168; and may communicate with the GRCS controller 114 through a first secure communication link and protocol, and/or a second secure communication link and protocol. The GCC 148 may be described in more detail in relation to FIGS. 2A and 2B; and methods of communication between the GRCS controller 104 and the GCC 148 may be described in more detail in relation to FIGS. 5A-5L.

The GOC 152 may be used by a ground crew observer 154 who may walk beside or near one of the aircraft wings 131 and use the GOC 152 to warn the ground crew member 150 if there is a danger of collision by one of the aircraft wings 131 with another object; and/or initiate an emergency stop of the aircraft 102 to prevent a collision. The GOC 152 may be wirelessly and communicatively connected to the GRCS controller 104 through the SPD 106 through communicative link 168; and may communicate with the GRCS controller 114 through a first secure communication link and protocol, and/or a second secure communication link and protocol. The GOC 152 may be described in more detail in relation to FIG. 2C; and methods of communication between the GRCS controller 104 and the GOC 152 may be described in more detail in relation to FIGS. 5A-5L.

The FCGC 156 may be may be operated by an user, for example a flight crew member, at off-site location 158 remote from the aircraft 102, for example, a hotel 160, an office, or any location where a wireless communication link 168 may be available. The wireless communication link 168 may be a cellular, a satellite, an internet or any other wireless communication link which will securely connect the FCGC 156 with the GRCS controller 104. The FCGC 156 may be used to start the APU 170, an air-conditioning system 122, the heating system 124, or other aircraft systems 128. The FCGC 156 may be used to operate the temperature control system 176 to bring at least part of the inside of the aircraft 102 to a desired temperature, prior to boarding by the crew and passengers. The FCGC 156 may be wirelessly and communicatively connected to the GRCS controller 104 through the SPD 106 through communicative link 168; and may communicate with the GRCS controller 114 through a first secure communication link and protocol, and/or a second secure communication link and protocol. The FCGC 156 may be described in more detail in relation to FIG. 3A; and methods of communication between the GRCS controller 104 and the FCGC 156 may be described in more detail in relation to FIGS. 6A-6E.

Figure 2A:
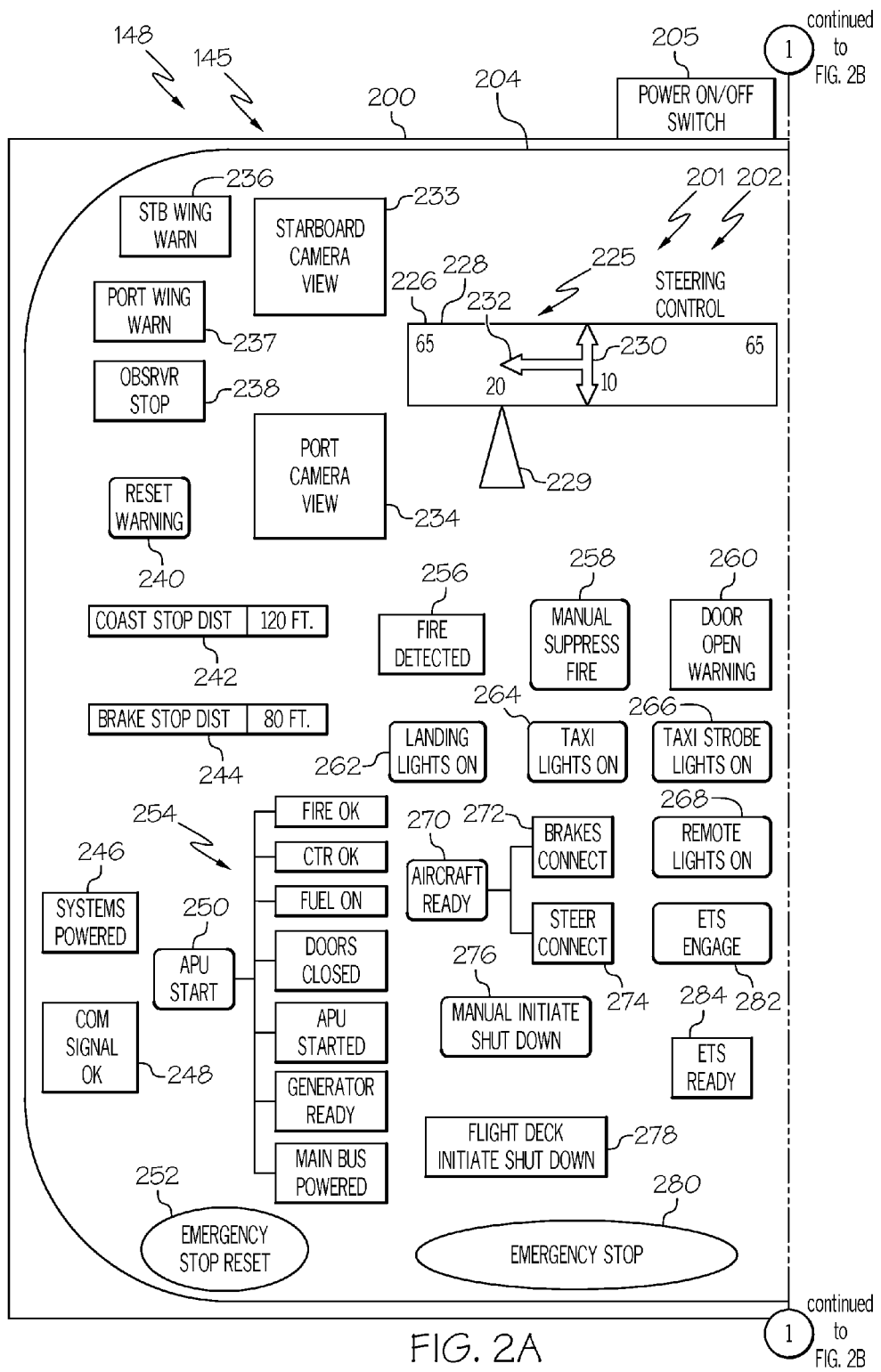
FIG. 2A is a schematic drawing of a first portion of an aircraft remote control device according to an exemplary embodiment of the present invention.
Figure 2B:
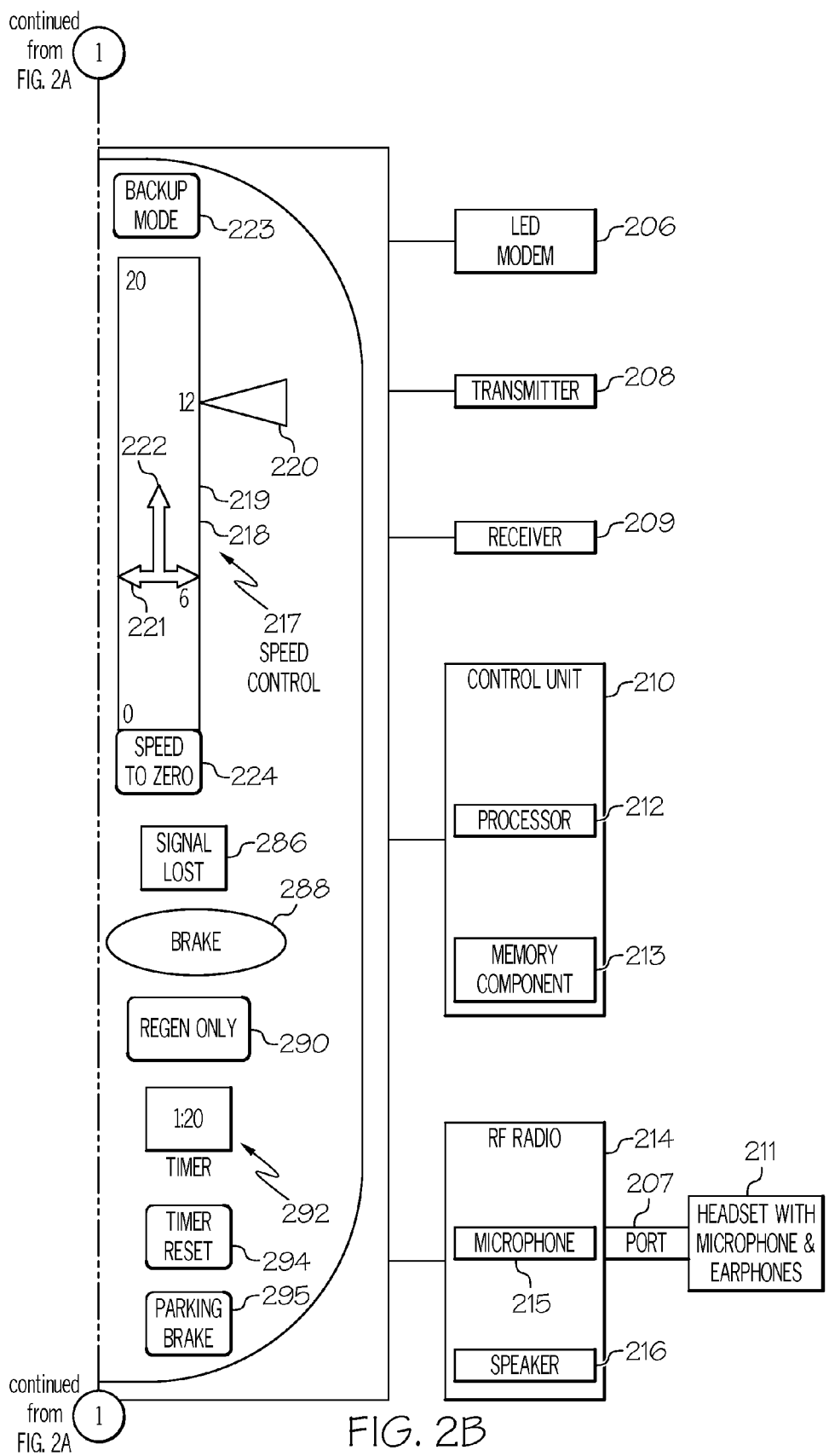
FIG. 2B is a schematic drawing of a second portion of the aircraft remote control device of FIG. 2A.

Referring now to FIGS. 2A and 2B, an exemplary embodiment of an aircraft remote control device 145 is illustrated in a schematic with a first portion (FIG. 2A) and a second portion (FIG. 2B). The remote control device 145 may include the GCC 148. The GCC 148 may include a user interface 200 for a ground crew member 150, or another person to enter control commands to control and move the aircraft 102. The user interface 200 may include user input devices 201 to input commands, information, or other signals; and display elements 202 to provide the user with information about the aircraft 102. In the exemplary embodiment illustrated, an interactive display sensitive to touch for input 204 may include the user input devices 201 and the display elements 202. The user input devices 201 may include areas of the interactive display 204 wherein a touch of a human finger or other touch device may generate a signal, such as, for example, a capacitive signal. In other embodiments, the user input devices 201 may include switches, buttons, keyboards, dials, sliding elements, voice activate devices, or other input devices known in the art. The display elements 202 may include areas of the interactive display 204 where specific information may be displayed. In some embodiments, an area of the interactive display 204 which includes an input device 201 may also include a display element. The area may turn different colors, or have different light intensities, corresponding to different types of information. For example, an area of the interactive display 204 may be green if a system or component of the aircraft 102 is on, blue if that system or component is beginning action, and red if the system or component has failed or triggered a warning. This will not be further explained in relation to the following description of the individual display elements 202, but it should be assumed that in at least one embodiment, the display elements 202 include this functionality.

The user interface 200 may include a power on/off switch 205 which may be configured to power the GCC 148 on and off. The switch 205 may be any mechanism or device which may control the power status of the user interface 200. The GCC 148 may include an LED modem 206 which may be configured to communicate with the LED modem 174 on the SPD 106 through the first secure communication link and protocol. Other embodiments may alternatively include other short range communication modems configured to communicate with the modem 172 on the SPD 106 for the first secure communication link and protocol.

The GCC 148 may include a transmitter 208 and receiver 209 configured to transmit information and signals to and receive information and signals from, respectively, the GRCS controller 104 through the wireless communication link 168. The GCC 148 may include a controller 210 with a processor 212 and memory component 213. The controller 210 may be configured to process input signals from the user input devices 201 and send signals indicative of the input signals in a secure form to the GRCS controller 104 through the transmitter 208; and process signals from the GRCS controller 104 through the receiver 209 and send signals to the display elements 202. The GCC 148 may include an RF radio 214 through which the ground crew member 150 may communicate as he/she generally communicates with a separate RF radio, for example with air traffic controllers. The RF radio 214 may include a microphone 215 and a port 207 configured to connect the RF Radio 214 with a headset 211 including a microphone and earphones.

The user interface 200 may include a speed control input 217 through which a user may input a desired speed for the aircraft 102. The speed control input 217 and other input devices, as well as display devices on the user interface 200 will be described below in relation to the embodiment illustrated in FIGS. 2A and 2B, but it will be understood by those skilled in the art, that all input devices 201, and display elements 202, may take other forms as are known in the art. The speed control input and display 217 may include a desired speed input device and display element (IDDE) 218 which may include a speed bar 219, a sliding desired speed selector 220, an actual speed display element 221, and an acceleration display element 222. The speed bar 219 may be a rectangular, or other shape, elongated area on the interactive display 204 with a textual element symbolizing zero, "0", at one end, and a textual element symbolizing a maximum speed input, in the illustrated embodiment "20", at the other end. The sliding desired speed selector 220 may be an area on the interactive display 204, illustrated as a triangle, which a user touches and then moves the touch spot to select a desired speed. The sliding desired speed selector 220 moves as the user moves the touch spot. A textual representation of desired speed chosen is also displayed.

The actual speed display element 221 may be a double arrowed thick line displayed across the speed bar 219 at a location corresponding to the actual speed of the aircraft 102, and a textual representation of the actual speed of the aircraft 102. The acceleration display element 222 may be a single arrow thick line perpendicular to and pointing away from the speed display element arrow. The direction and length of the single arrow line may correspond to the acceleration of the aircraft 102.

The user interface 200 may include a back-up mode IDDE 223 including an area of the interactive display 204 which when pressed indicates a desired backward direction of the aircraft 102. When the aircraft 102 is traveling in a backward direction, the back-up mode IDDE 223 may indicate this through different colors. The user interface 200 may include a zero speed IDDE 224 including an area of the interactive display 204 which when pressed indicates a desired aircraft 102 speed of zero ("0"), and may display the progress towards this in different colors.

The user interface 200 may include a steering control input and display 225 through which a user may input a desired nose gear angle for the aircraft 102. The steering control input and display 225 may include a desired steering angle IDDE 226 which may include a steering angle bar 228, a sliding desired steering angle selector 229, an actual steering angle display element 230, and a steering angle rate of change display element 231. The steering angle bar 228 may be a rectangular, or other shape, elongated area on the interactive display 204 with a textual element symbolizing a maximum steering angle input for the port side of the aircraft 102, in the illustrated embodiment "65", at one end, and a textual element symbolizing a maximum steering angle input for the starboard side of the aircraft 102, in the illustrated embodiment "65", at the other end. The sliding desired steering angle selector 229 may be an area on the interactive display 204, illustrated as a triangle, which a user touches and then moves the touch spot to select a desired steering angle. The sliding desired steering angle selector 220 moves as the user moves the touch spot. A textual representation of desired steering angle chosen is also displayed.

The actual steering angle display element 230 may be a double arrowed thick line displayed across the steering bar 228 at a location corresponding to the actual steering angle of the aircraft 102, and a textual representation of the actual steering angle of the aircraft 102. The steering angle rate of change display element 232 may be a single arrow thick line perpendicular to and pointing away from the steering angle display element arrow. The direction and length of the single arrow line may correspond to the rate of change of the steering angle of the aircraft 102.

The user interface 200 may include a starboard camera view display area 233, and a port camera view display areas 234, including areas on the interactive display 204 where images transmitted from cameras 132 on the starboard and port wings 131 respectively are displayed. The user interface may include a starboard wing warning display element 236 and a port wing collision warning display element 237, including areas of the interactive display 204 which may be activated when the GCC 148 receives a collision warning signal for the starboard or port wing 131 respectively. The collision warning may be generated by the wing anti-collision system or from the GOC 152, as will be further described in relation to FIG. 2C. The user interface 200 may include an observer initiated stop display element 238 which may be activated when an emergency stop is initiated from the GOC 152, as will be further described in relation to FIG. 2C. The user interface 200 may include a reset warning input device 240 which may reset all warning display elements.

The user interface 200 may include a coast stop distance display element 242 which may be an area of the interactive display 204 which may include a text label and a textual representation of the distance which the aircraft 102 may travel before coming to a stop if all motive power were discontinued, but no braking was applied. The user interface 200 may include a brake stop distance display element 244 which may be an area of the interactive display 204 which may include a text label and a textual representation of the distance which the aircraft 102 may travel before coming to a stop if all motive power were discontinued, and full braking was applied. The coast stop and brake stop distances may be calculated and updated as coasting and/or braking occurs and the coast stop distance display element 242 and/or the brake stop distance display element 244 may display the updated values.

The user interface 200 may include a systems powered display element 246 which may include an area of the interactive display and may be activated when systems needed to move, brake, and steer the aircraft 102 remotely from the GCC 148 are all powered. The systems powered display element 246 may be active in a different color or other distinguishable mode while the systems needed to move, brake, and steer the aircraft 102 remotely from the GCC 148 are being powered up and/or have been successfully powered up. The user interface 200 may include a communication link enabled display element 248 which may include an area of the interactive display and may be activated when the second secure communication link and protocol between the GCC 148 and the GRCS controller 104 is enabled. The communication link enabled display element 248 may be active in a different color or other distinguishable mode while the second secure communication link and protocol between the GCC 148 and the GRCS controller 104 is being established.

The user interface 200 may include a start APU IDDE 250 which may include an area of the interactive display 204, configured to allow a user to input a start APU command; and configured to activate as a display element when the APU 170 is started, and be active in a different color or other distinguishable mode while the APU 170 is starting. The user interface 200 may include an emergency stop reset input device 252 which may include an area of the interactive display 204, configured to allow a user to input an emergency stop reset input after an emergency stop of the aircraft 102 has occurred.

The user interface 200 may include one or more start-up systems ready display elements 254 which may include an one or more areas of the interactive display 204, and may be configured to activate as aircraft 102 systems represented by the display devices have been powered and/or have passed self-tests. The systems ready display elements 254 may include, in non-limiting examples, a fire systems OK display element configured to activate when the fire suppression system 178 has been powered and passed a self-test; a center fuel tank pump/select system (CTR) OK display element configured to activate when a CTR has been powered and passed a self-test; a fuel on display element configured to activate when a fuel system of the APU 170 has been powered and passed a self-test; a doors closed display element configured to activate when the GRCS controller 104 determines all doors are closed; an APU started display element configured to activate when the APU 170 has started and passed a self-test; a generator ready display element configured to activate when a generator of the APU 170 has been powered and passed a self-test; and a main bus powered display element configured to activate when a main electrical bus has been powered by the APU 170 and passed a self-test.

The user interface 200 may include a fire detected display element 256, which may include an area of the interactive display 204, which may be activated when a fire on the aircraft 102 is detected. The user interface 200 may include a manual fire suppression input device, which may include an area of the interactive display 204, through which an user may input a command to activate the fire suppression system 178 of the aircraft 102, rather than the fire suppression system 178 activating automatically. The user interface 200 may include a door open display element 260, which may include an area of the interactive display 204, which may be activated when it is detected that a door on the aircraft 102 is open.

The user interface 200 may include a taxi light on IDDE 264, which may include an area of the interactive display 204, through which an user may input a command to turn the taxi lights (not shown) of the aircraft 102 on, and in which the display device may be activated in one mode when the taxi lights are in the process of being turned on, and in another mode when the taxi lights are on. The user interface 200 may include a taxi strobe lights on IDDE 266 which may include an area of the interactive display 204, through which an user may input a command to turn the taxi strobe lights (not shown) of the aircraft 102 on, and in which the display device may be activated in one mode when the taxi strobe lights are in the process of being turned on, and in another mode when the taxi strobe lights are on. The user interface 200 may include a remote operation lights on IDDE 268, which may include an area of the interactive display 204, through which an user may input a command to turn the remote operation lights 136 on, and in which the display device may be activated in one mode when the remote operation lights 136 are in the process of being turned on, and in another mode when the remote operation lights 136 are on. The remote operation lights 136 may warn others visually that the aircraft 102 is under remote operation.

The user interface 200 may include an aircraft ready IDDE 270, which may include an area of the interactive display 204, through which an user may input a command to enable the braking system 120, and the steering system 126; and in which the display device may be activated in one mode when the braking system 120, and the steering system 126 are being enabled, and in another mode when the braking system 120, and the steering system 126 are enabled. The user interface 200 may include a brake system connected display element 272, which may include an area of the interactive display 204, and in which the display device may be activated in one mode when the braking system 120 is being enabled, and in another mode when the braking system 120 is enabled. The user interface 200 may include a steer system connected display element 274, which may include an area of the interactive display 204, and in which the display device may be activated in one mode when the steering system 126 is being enabled, and in another mode when the steering system 126 is enabled.

The user interface 200 may include a manual initiated shut down IDDE 276, which may include an area of the interactive display 204, through which an user may input a command to shut down the aircraft 102; and in which the display device may be activated in one mode when the aircraft 102 is being shut down, and in another mode when the aircraft 102 is shut down. The user interface 200 may include a flight deck initiated shut down display element 278, which may include an area of the interactive display 204, in which the display device may be activated when the aircraft 102 is shut down through a user interface on the flight deck 108. The user interface 200 may include an emergency stop IDDE 280, which may include an area of the interactive display 204, through which an user may input a command to stop the aircraft 102 with all braking power available; and in which the display device may be activated in one mode when the aircraft 102 is being stopped, and in another mode when the aircraft 102 is stopped.

Some ETSs 118 may include clutches or other mechanisms (not shown) which may need to be engaged for the ETS 118 to operate even after power is applied to the system. The user interface 200 may include an ETS engage input device 282, which may include an area of the interactive display 204, through which a user may input a command to engage the ETS 118. The user interface 200 may include an ETS ready display element 284, which may include an area of the interactive display 204, in which the display device may be activated in one mode when the ETS 118 is being powered on and runs a self-test, and in another mode when the ETS 118 is ready. The user interface 200 may include communication signal lost display element 286, which may include an area of the interactive display 204, in which the display device may be activated when the communication link 168 with the SPD 106 and/or GRCE controller 104 is lost.

The user interface 200 may include a brake input device 288, which may include an area of the interactive display 204, through which a user may input a command to slow the aircraft 102 regardless of the desired speed input. The braking system 120 and the ETS 118 run in a regeneration mode may be used to slow the aircraft 102 in response to the user input. The user interface 200 may include a regeneration brake only input device 290, which may include an area of the interactive display 204, through which a user may input a command to slow the aircraft 102 regardless of the desired speed input, using only the regeneration mode of the ETS 118.

The GCC 148 may shut down if no commands are entered into the user interface 200 for a predetermined period of time, if a timer is not reset. The user interface 200 may include a timer display element 292, which may include an area of the interactive display 204, where time left in the predetermined time period is displayed. The user interface 200 may include a timer reset input device 294, which may include an area of the interactive display 204, through which a user may reset the predetermined time period. The user interface 200 may include a parking brake IDDE 295, which may include an area of the interactive display 204, through which a user may engage or disengage a parking brake (not shown) on the aircraft 102; and in which the display device may be activated in when the parking brake is engaged. The use of the GCC 148 will be further described in relation to FIGS. 5A-5L.

Figure 2C:
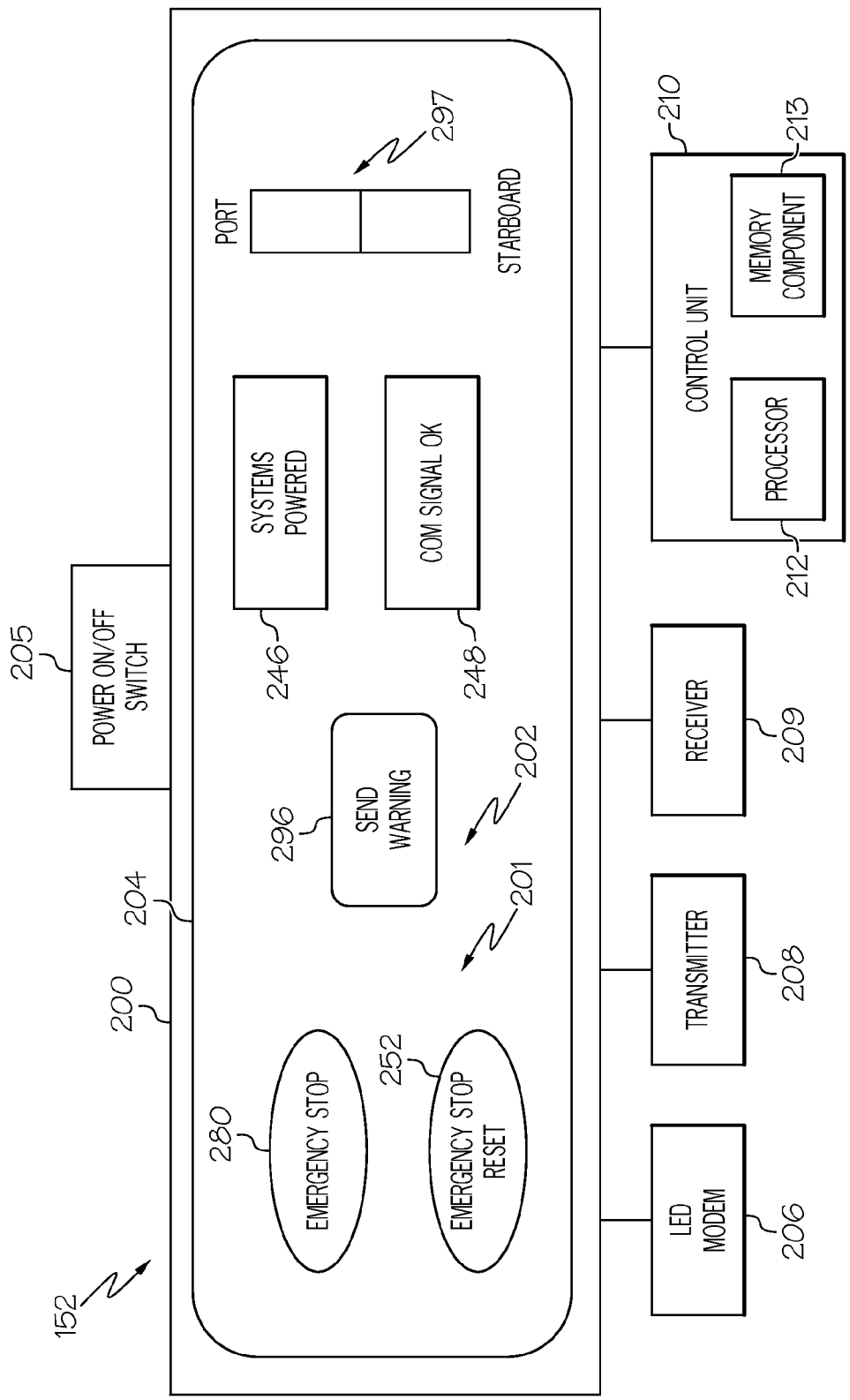
FIG. 2C is a schematic drawing of a second embodiment of the aircraft remote control device according to an exemplary embodiment of the present invention.

Referring now to FIG. 2C, an exemplary second embodiment of the aircraft remote control device 145 is illustrated in a schematic. The remote control device 145 may include the ground observe controller 152. The GOC 152 may include a user interface 200 for a ground observer 154, or another person to enter limited commands to control the aircraft 102. The ground observer 154 may user the GOC 152 in concert with a ground crew member 150 who is moving and controlling the aircraft 102 with another remote control device 145, which may include the GCC 148. The ground observer 154 may be stationed near one of the wings 131 and may send a warning to the GCC 148, with the GOC 152, if there is a danger of a collision between the aircraft 102 and another object. The ground observer 154 may also initiate an emergency stop of the aircraft 102 with the GOC 152, if a collision seems otherwise imminent. The GOC 152 may have similar elements as the GCC 148, which were described in relation to FIGS. 2A and 2B. These elements are numbered similarly and will not be described again. Also, as shown in FIG. 2C the GOC 152 may have only a minimal number of elements similar to FIGS. 2A and 2B in order to simplify operation. The unit may be the same as in FIGS. 2A and 2B but the software may display only a limited number of or different elements.

In addition to elements already described, the GOC 152 may include a send warning IDDE 296, and a port or starboard selector 297. The ground observer 154 (or other user) may select on the port or starboard selector 296 the side of the aircraft on which they are located. If the wing 131 on that side of the aircraft 102 is in danger of colliding with an obstacle, the ground observer 154 may enter a warning input on through the send warning IDDE 296; and the display element may activate for a time period to indicate that the warning has been sent. The GOC 152 may send the warning to the GCC 148 via the GRSC controller 104 and/or the SPD 106.

Figure 2D:
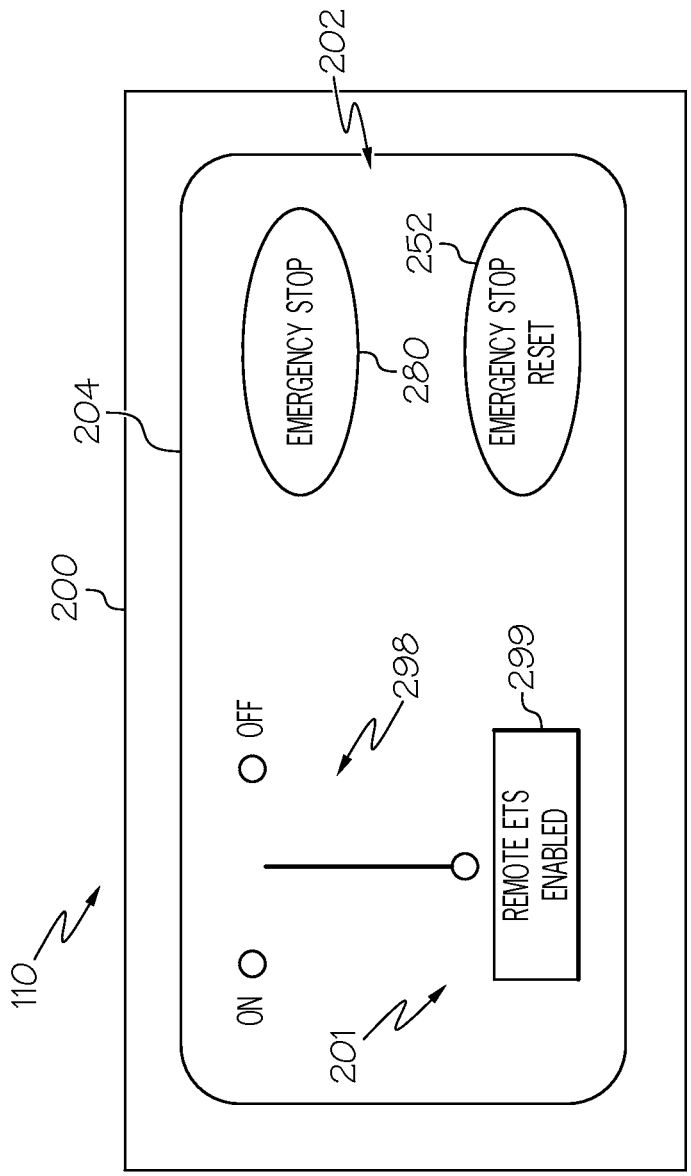
FIG. 2D is a schematic drawing of an aircraft remote control user interface according to an exemplary embodiment of the present invention.

Referring now to FIG. 2D, an exemplary aircraft remote control user interface 110 is illustrated in a schematic. The aircraft remote control user interface 110 may be located in the flight deck 108 of the aircraft 102, and may include a user interface 200 for a crew member or other person to select whether to allow the aircraft to be controlled with a remote control device 145, and to allow an emergency stop to be initiated from the flight deck 108. The pilot, another crew member, or another authorized person may select whether to allow remote control of the aircraft 102, for example from the ground, with the GCC 148 and the GOC 152, before leaving the flight deck, and/or securing the aircraft 102. The aircraft remote control user interface 110 may have similar elements as the GCC 148, which were described in relation to FIGS. 2A-2C. These elements are numbered similarly and will not be described again.

In addition to elements already described, the aircraft remote control user interface 110 may include a remote control on/off selector 298, and a remote control enabled display element 299. The remote control on/off selector 298 may include a dial, as illustrated in the schematic, or any other user input as known in the art. The user may select an "on" option by turning the dial to on to enable remote control of the aircraft 102, or may select an "off" option by turning the dial to prevent the aircraft 102 being controlled remotely. If an "on" option is chosen the remote control enabled display element 299 may be activated.

Figure 3A:
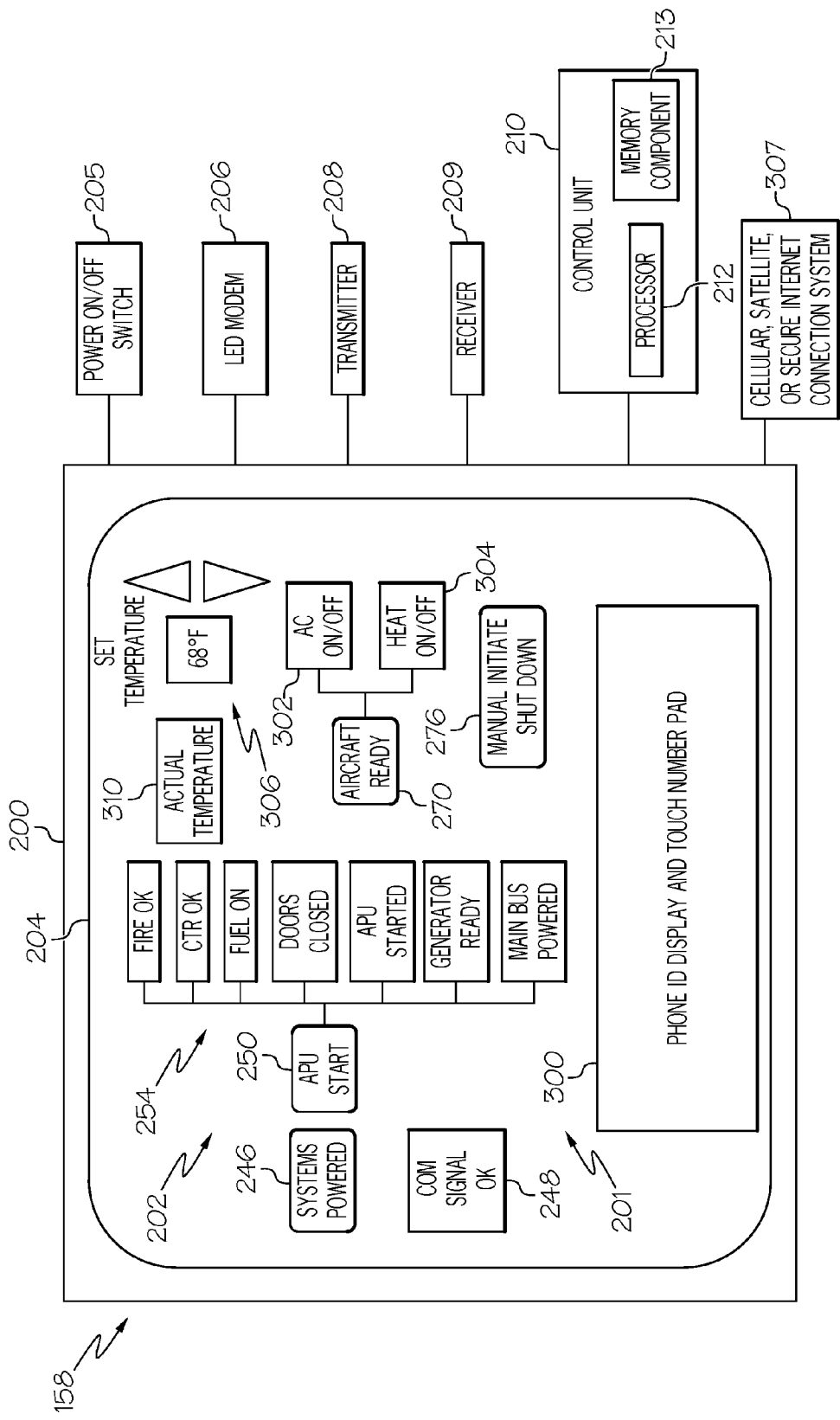
FIG. 3A is a schematic drawing of a third embodiment of the aircraft remote control device according to an exemplary embodiment of the present invention.

Referring now to FIG. 3A, an exemplary third embodiment of the aircraft remote control device 145 is illustrated in a schematic. The remote control device 145 may include the FCGC 156. The FCGC 156 may include a user interface 200 for a crew member, or another person to enter limited commands to control some systems of the aircraft 102 from an off-site location 158, such as a hotel 160. Non-limiting examples of systems that may be controlled include the air conditioning system 122, the heating system 124, and/or the temperature control system 176. The FCGC 156 may have similar elements as the GCC 148 and/or the GOC 152, which were described in relation to FIGS. 2A-2C. These elements are numbered similarly and will not be described again.

In addition to elements already described, the FCGC 156 may include a display and user interface 300, an air conditioning system display element 302, a heat system display element 304, a desired temperature IDDE 306, an actual temperature display element 310, and a cellular, satellite, or secure connection system 307. The display and user interface 300 may be used while the FCGC 156 is in proximity to the aircraft using the LED Modem 206 (the first secure communication link and protocol) and at an off-site location to establish the second secure communication link and protocol. The air conditioning system display element 302, and heat system display element 304 may be activated when the air conditioning system 122, and heating system 124 are powered on and self-tested. The temperature IDDE 306 may allow the user to input a desired temperature of at least part of the inside of the aircraft 102. In the depicted embodiment, the desired temperature may be inputted by pushing the two triangles. The top triangle increases the desired temperature, and the bottom triangle decreases the desired temperature. The desired temperature is displayed in an area of the user interface 200. The actual temperature display element 310 may display the actual temperature of the at least part of the aircraft, such that a flight crew member may monitor the temperature from a remote location such as a hotel. The connection system 307 may connect the FCGC 156 with the SPD 106 and/or the GRCS controller 104 as will be further explained in relation to FIGS. 6A-6E.

In some embodiments, the aircraft 102 may be controlled at different times by the GCC 148 and the FCGC 156. In these embodiments, if the GCC 148 is already enabled and connected to the GRCS controller 104 when the FCGC 156 attempts to establish communication with the GRCS controller 104, the FCGC 156 commands may be ignored by the GRCS controller 104 and the data connection between the FCGC 156 and the GRCS controller 104 may not be established. If the FCGC 156 control through the GRSC controller 104 and/or SPD 106 has been established prior to the GCC 148 attempting to communicate with the GRCS controller 104, then the GCC 148 commands may be ignored by the GRCS controller 104 and the data connection between the GCC 148 and the GRCS controller 104 may not be established. In some embodiments, the GCC 148 may have a display indicating control has been established by the FCGC 156; and the FCGC 156 may have a display indication that the GCC 148 is in control. However, in applications where there is coordination between aircraft crew and ground crew, especially in business jet operations, where typically the aircraft 102 is moved by the aircraft crew, the control indicators may not be included.

Figure 3B:
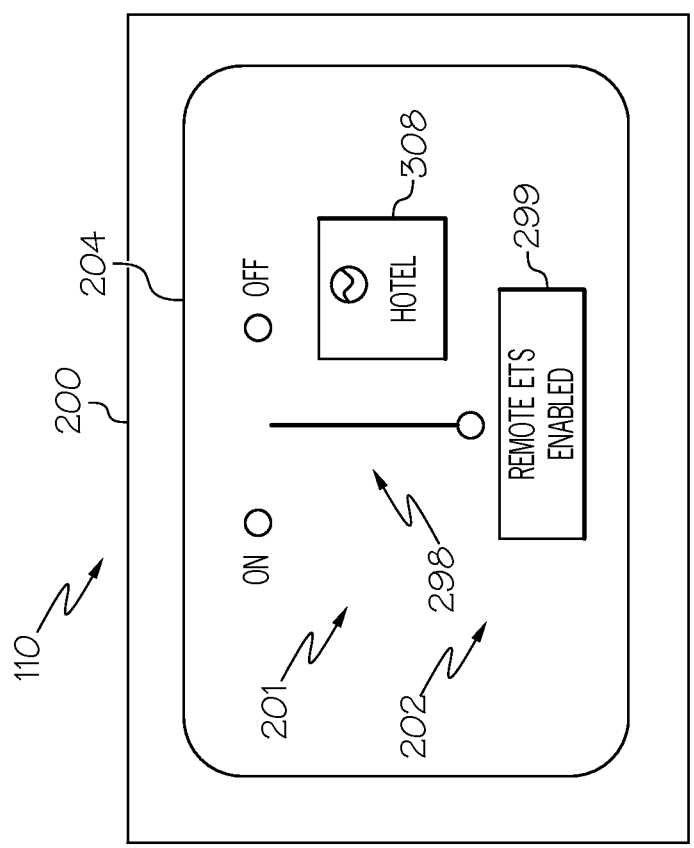
FIG. 3B is a schematic drawing of a second embodiment of the aircraft remote control user interface according to an exemplary embodiment of the present invention.

Referring now to FIG. 3B, an exemplary second embodiment of an aircraft remote control user interface 110 is illustrated in a schematic. The aircraft remote control user interface 110 may be located in the flight deck 108 of the aircraft 102, and may include a user interface 200 for a crew member or other person to select whether to allow systems of the aircraft 102 to be controlled with a remote control device 145, for example the FCGC 156, from an off-site location 158. The aircraft remote control user interface 110 may have similar elements as the remote control devices 145, and remote control user interface 110 which were described in relation to FIGS. 2A-2D, and 3A. These elements are numbered similarly and will not be described again.

In addition to elements already described, the aircraft remote control user interface 110 may include a hotel enabled display element 308. The hotel enabled display element 308 may be activated when the FCGC 156 has established communication with the SPD 106 and/or the GRCS controller 104 from the off-site location. This may provide additional information to any person in the aircraft 102 that the hotel mode is active.

Figure 4A:
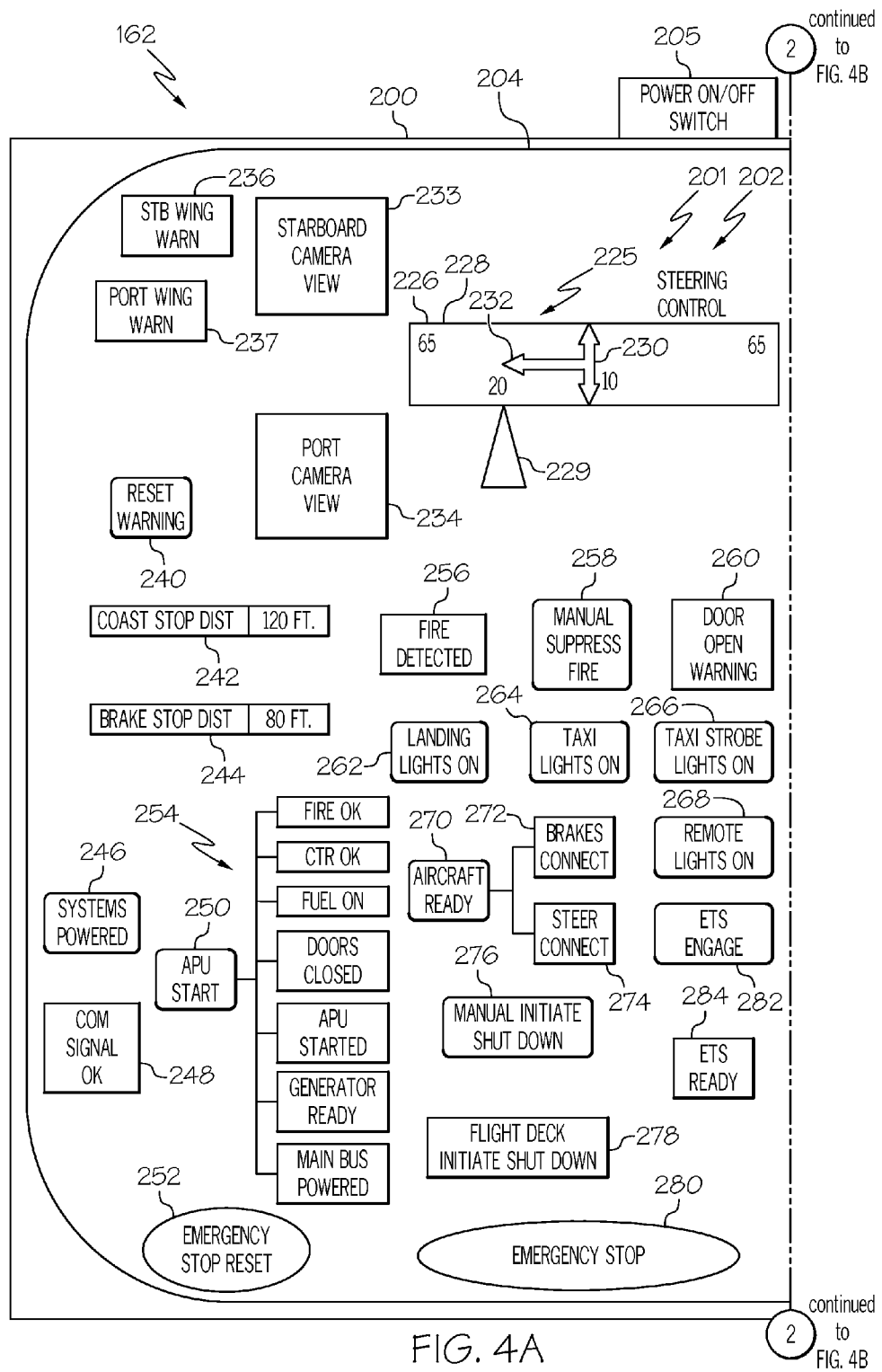
FIG. 4A is a schematic drawing of a first portion of a fourth embodiment of the aircraft remote control device according to an exemplary embodiment of the present invention.
Figure 4B:
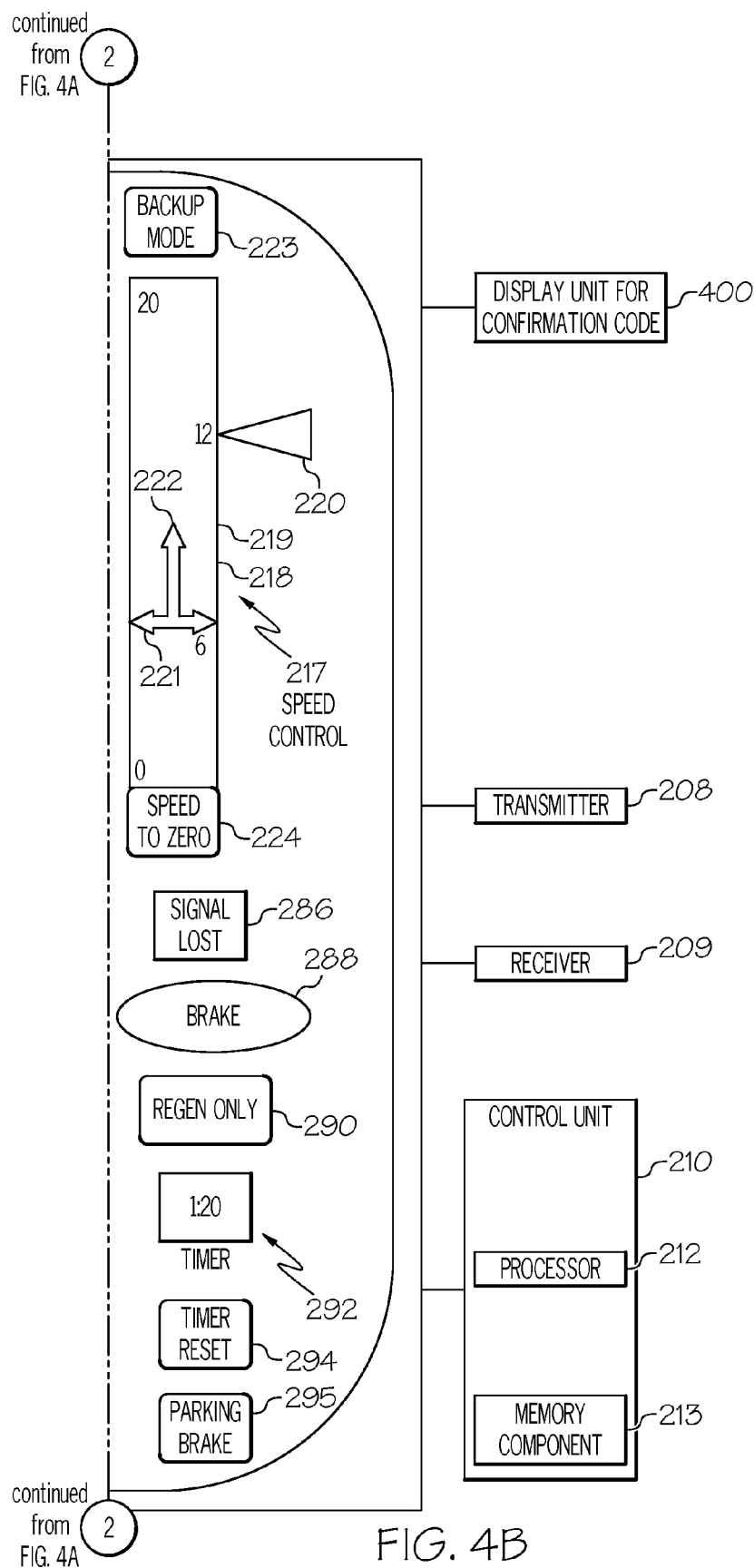
FIG. 4B is a schematic drawing of a second portion of the fourth embodiment of the aircraft remote control device of FIG. 4A.

Referring now to FIGS. 4A and 4B, an exemplary fourth embodiment of the aircraft remote control device 145 is illustrated in a schematic with a first portion (FIG. 4A) and a second portion (FIG. 4B). The remote control device 145 may include the ROC 162. The ROC 162 may include the user interface 200 for a user in a remote location 164 where the user can observe the aircraft 102, for example an air traffic control tower 166, to input commands to move the aircraft 102. The ROC 162 may have similar elements as other remote control devices 145, which were described in relation to FIGS. 2A-2D, and 3A-3B. These elements are numbered similarly and will not be described again. The ROC 162 may include all but a few of the elements of the GCC 148. For example, the ROC 162 may not include the observer initiated stop display element 238 as an observer may not be present during remote operations; or the LED modem 206 as communication protocols may be commenced in a different manner as described in relation to FIGS. 7A-7C. The ROC 162 may include a separate device unit, software and displays on another electronic device, or may be a built-in portion of a control panel or display.

In addition to elements already described, ROC 162 may include a remote control device display 400 which may display a confirmation code sent by the aircraft remote control user interface 110 in response to an input from the pilot, a crew member or another person.

Figure 4C:
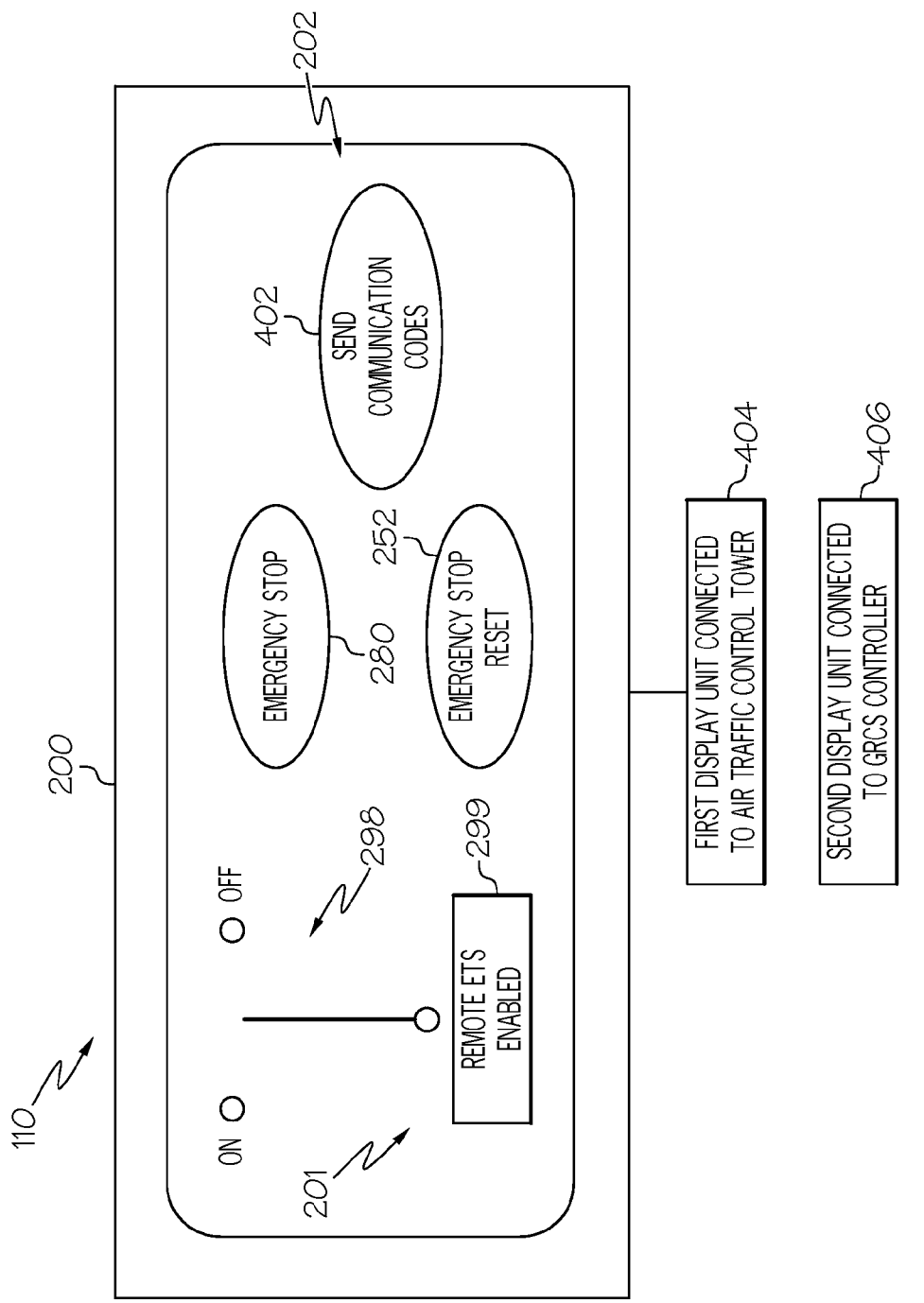
FIG. 4C is a schematic drawing of a third embodiment of the aircraft remote control user interface according to an exemplary embodiment of the present invention.

Referring now to FIG. 4C, an exemplary third embodiment of an aircraft remote control user interface 110 is illustrated in a schematic. The aircraft remote control user interface 110 may be located in the flight deck 108 of the aircraft 102, and may include the user interface 200 for the pilot, crew member, or another person to turn control of the aircraft 102 over to a third party, such as an air traffic controller, via the ROC 162. The aircraft remote control user interface 110 may have similar elements as the embodiments of the remote control devices 145, and remote control user interface 110 which were described in relation to FIGS. 2A-2D, 3A-3B, and 4A-4B. These elements are numbered similarly and will not be described again.

In addition to elements already described, the aircraft remote control user interface 110 may include a send codes input device 402, a first aircraft display unit 404, and a second aircraft display unit 406. The send codes input device 402 may be configured to allow, for example the pilot, to send random security confirmation codes to the ROC 162, or another remote control device 145 to establish a first or second secure communication link and protocol. The first aircraft display unit 404 may display confirmation codes sent from a person who wishes to establish remote control of the first aircraft 102. The second aircraft display unit 406 may display confirmation codes sent from a person who wishes to establish remote control of the first aircraft 102. The confirmation codes displayed on the first aircraft display unit 404 may be sent via a different communication link and/or protocol than the confirmation codes displayed on the second aircraft display unit 406.

Figure 5A:
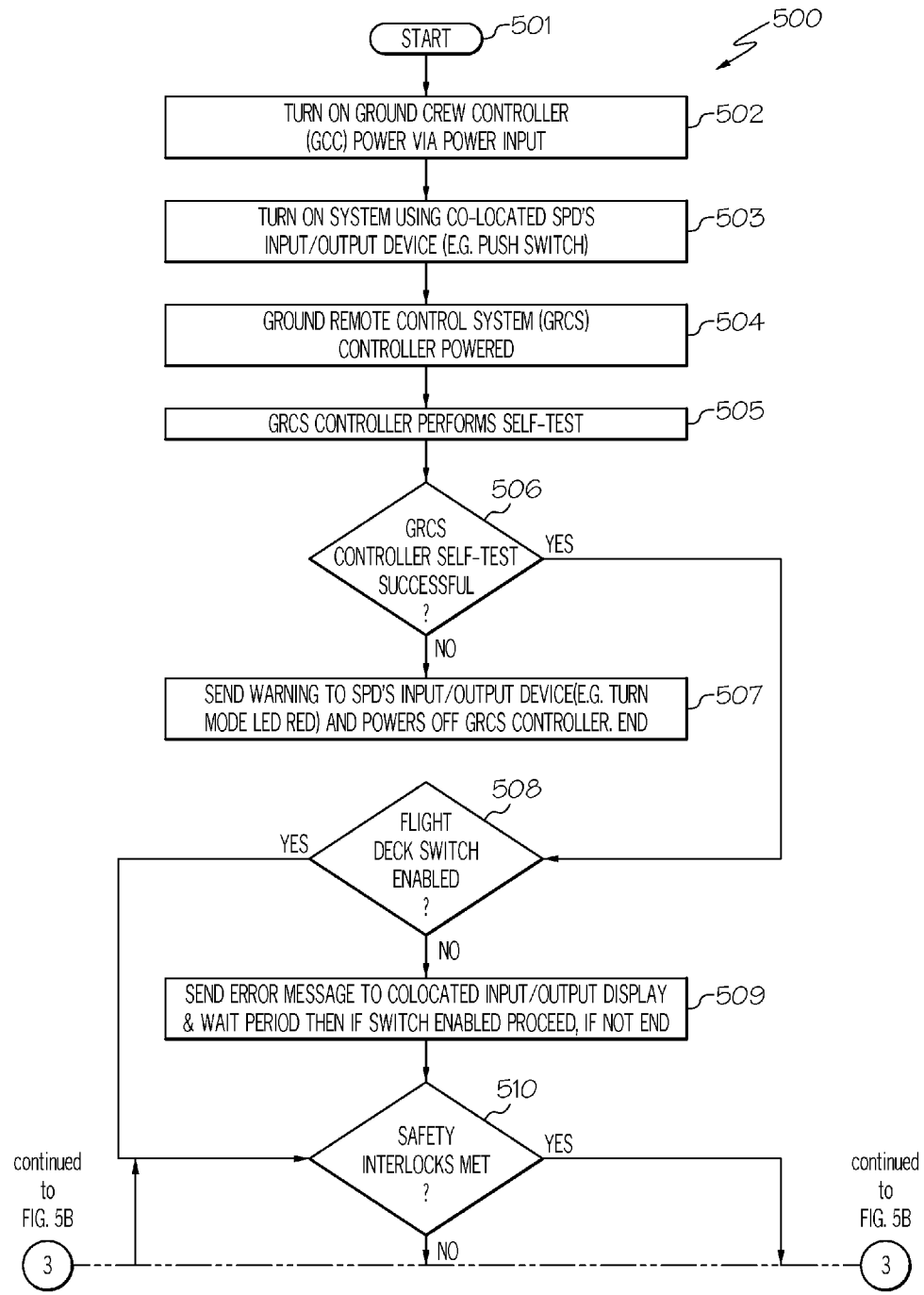
FIG. 5A is a flow chart of a first portion of a ground remote control method for an aircraft with an electric taxi system according to an exemplary embodiment of the present invention.

Referring now to FIG. 5A, a first portion of an exemplary ground remote control method 500 for the aircraft 102 with the ETS 118 is illustrated with a flow chart. The method starts at step 501. The GCC 148 may be turned on with the power on/off switch 205 (step 502). An input may be made through the co-located input device 130 to power the SDC and GRCS. (step 503). In response to the input on the co-located input device 130, the GRCS controller 104 may power up and then perform a self-test (steps 504, 505). If the GRCS controller 104 self-test is unsuccessful, an error message may be sent to the co-located input/output display 130 and the method 500 then ends (steps 506, 507). If the GRCS controller 104 self-test is successful, the GRCS controller 104 may check if the remote control on/off selector 298, in the flight deck 108, is in an "on" position (step 508). If the remote control on/off selector 298 is in an "off" position, an error message may be sent to the co-located input/output display 130 and the system 100 may wait a predetermined time period to give the ground crew 150 a chance to set the remote control on/off selector 298 in case they neglected to do so earlier. If the remote control on/off selector 298 is still in an "off" position after the predetermined time period, the method 500 may end. If the remote control on/off selector 298 is switch to an "on" position during the predetermined time period the method 500 may proceed (step 509). If the remote control on/off selector 298 is in an "on" position, the GRCS controller 104 may check if other safety interlocks are met, such as, but not limited to, the aircraft 102 being on the ground, the aircraft 102 main engines being off, and/or the parking brake being set (step 510). The method 500 may continue to steps in FIG. 5B.

Figure 5B:
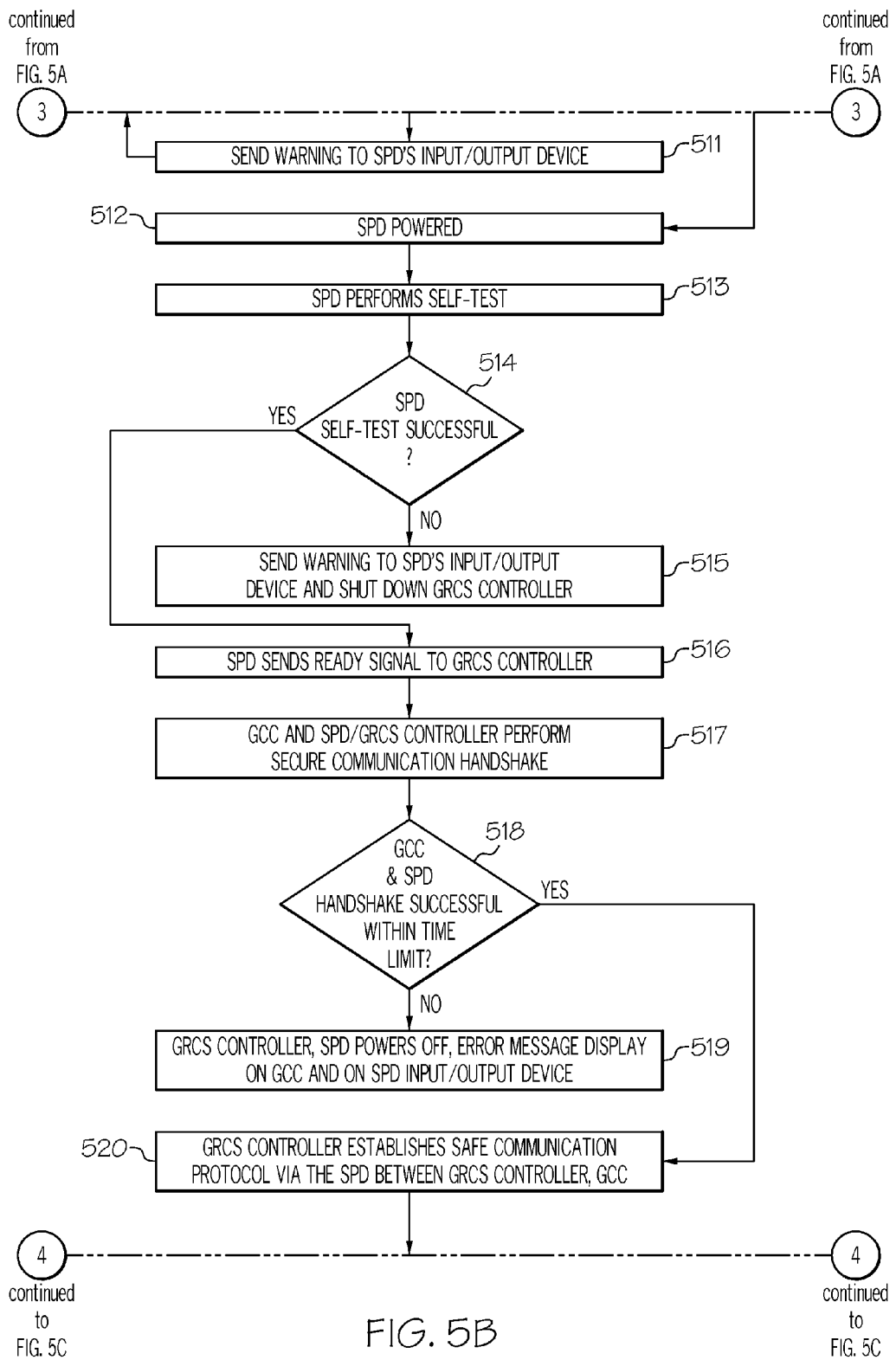
FIG. 5B is a flow chart of a second portion of a ground remote control method for an aircraft with an electric taxi system according to an exemplary embodiment of the present invention.

Referring now to FIG. 5B, a second portion of an exemplary ground remote control method 500 for the aircraft 102 with the ETS 118 is illustrated with a flow chart. If any of the safety interlocks are not met, an error message may be sent to co-located input/output device 130 mounted on the aircraft (step 511). The system 100 may not proceed until the interlocks are set properly. If all of the safety interlocks are met, the SPD 106 may be powered up and may perform a self-test (steps 512, 513). If the SPD 106 self-test is unsuccessful, an error message may be sent to the co-located input/output device 130, the SPD 106 and GRSC controller 104 may shut down, and the method may end (step 515). If the SPD 106 self-test is successful, the SPD 106 may send a ready signal to the GRCS controller 104 (step 516).

In response to the SPD 106 ready signal, with the GCC 148 in close proximity to the SPD 106, or SPD's antenna, modulated LED, and/or cable connection, the GCC 148 and the SPD 106 may perform a secure communication handshake. The secure handshake may include the GCC 148 looking for the LED modem 174 (or other modem type) signal, and establishing communication by means of public and/or private key certificates which may be unique to the airline that the aircraft 102 is part of (step 517). The GRCS controller 104 may set a timer for a predetermined time period, on the success of the secure handshake between the GCC 148 and the SPD 106 (step 518). If the handshake is not successful within the predetermined time period, an error message may be sent through the modem 172 to the GCC 148, and the communication signal lost display element 286 may be activated. The SPD 106 and GRSC controller 104 may shut down and the method 500 then ends (step 519). If the handshake is successful within the predetermined time period, the GRCS controller 104 may establish a safe communication link and protocol between the GRCS controller 104, the SPD 106, and the GCC 148. The secure communication link and protocol may be established through the GRCS controller 104 generating a random number at each start-up which may be sent to the SPD 106 which may then send the random numbers to the GCC 148. The random numbers may be used to establish one time passwords or to encode messages between the GRSC controller 104, the SPD 106, and the GCC 148 and to authenticate signals (step 520). The method 500 may continue to steps in FIG. 5C.

Figure 5C:
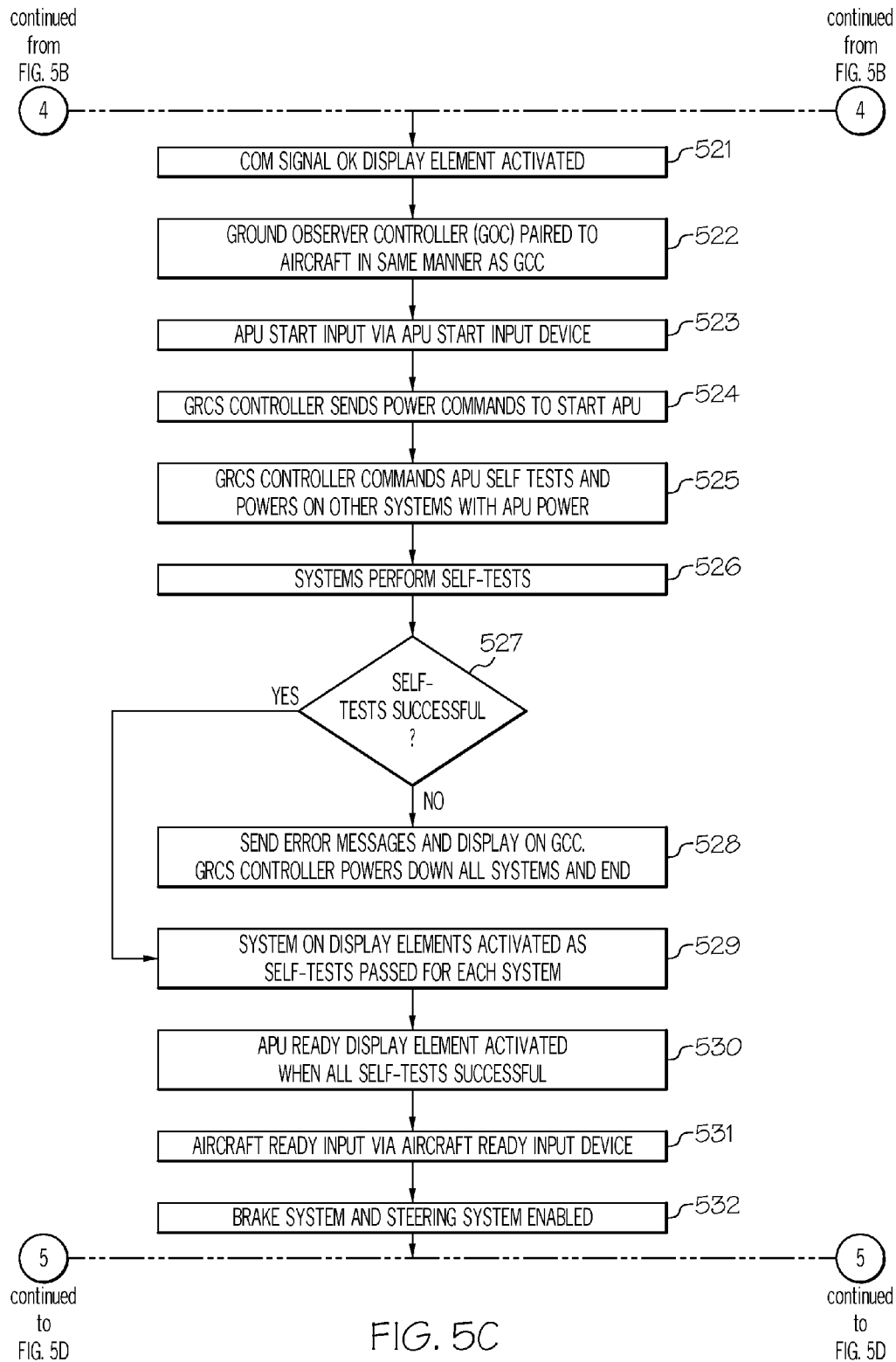
FIG. 5C is a flow chart of a third portion of a ground remote control method for an aircraft with an electric taxi system according to an exemplary embodiment of the present invention.

Referring now to FIG. 5C, a third portion of an exemplary ground remote control method 500 for the aircraft 102 with the ETS 118 is illustrated with a flow chart. Upon establishment of the secure communication link and protocols, the communication link enabled display device 248 may be activated on the GCC 148 (step 521). The GOC 152 may then be paired with the SPD 106 and the GRCS controller 104 in the same manner as the GCC 148 (step 522).

An APU start input may be made through the start APU IDDE 250 (step 523). When an input is made on any input device on any of the remote control devices 145, the input device may generate an input signal corresponding to the function of that input device which may be transmitted to the control unit 210 of the remote control device 145. The control unit 210 may encrypt the input signal and send the input signal through the transmitter 208 to the SPD 106 and/or GRCS controller 104 which may decrypt the input signal and send commands corresponding to the input signal to various systems of the aircraft 102. From here forward in the description when an input is made to an input device, it will be assumed that these steps may be followed, but they will not be repeated. It may also be assumed, even if not stated, that if a display device is activated on a remote control device 145 in response to conditions or signals on the aircraft 102, that the GRCS controller 104 may receive signals indicative of the conditions, generate a display signal, encrypt and send the display signal (through the SPD 106) through a communication link 168 to the control unit 210, through the receiver 209. The control unit 210 may then sends signals indicative of the display signal to the display element to activate or deactivate the display element.

The GRCS controller 104 may send power commands to the APU 170 and the APU 170 may start (step 524). The GRCS controller 104 may then command APU 170 self-tests, and turn aircraft 102 start-up systems on, and the system powered display element 246 may be activated. When an operation is being performed by the GRCS controller 104, or another aircraft 102 system, a display element on one of the remote control devices 145 may activate in a first mode indicating that a system is being activated. Once the system is activated, the display element may be activated in a second mode indicating the system is active. If the system activation fails, the display element may be activated in a third mode indicating the system failed to activate. For example, the first mode may include the display element turning a first color, for example blue; the second mode may include the display element turning a second color, for example green; and the third mode may include the display element turning a third color, for example, red. From here forward in the description, it will only read that when the system is activated the display device is activated, and it should be assumed that the display device may have activated in other modes. These systems may include, but are not limited to, the fire suppression system 178, a doors open check system, a fuel system, an APU generator, an APU main bus, a center fuel tank pump/select system (CTR), and other systems as would be known in the art (step 525).

The systems powered on by the GRCS controller 104 may run self-tests (step 526). If a system fails the self-test, an error message may be sent to the GCC 148, and the communication signal lost display element 286 may be activated, and the method 500 then ends (steps 527, 528). As each system passes a self-test, the start-up systems ready display elements 254 may activate (step 529). When all start-up systems have passed the self-test, the start APU display element 250 may activate (step 530).

An aircraft ready input may be made on the aircraft ready input device 270 (step 531). In response to the input, the GRCS controller 104 may enable the braking system 120 and the steering system 126, and the braking system 120 and the steering system 126 may perform a self-test (step 532). The method 500 may continue to steps in FIG. 5D.

Figure 5D:
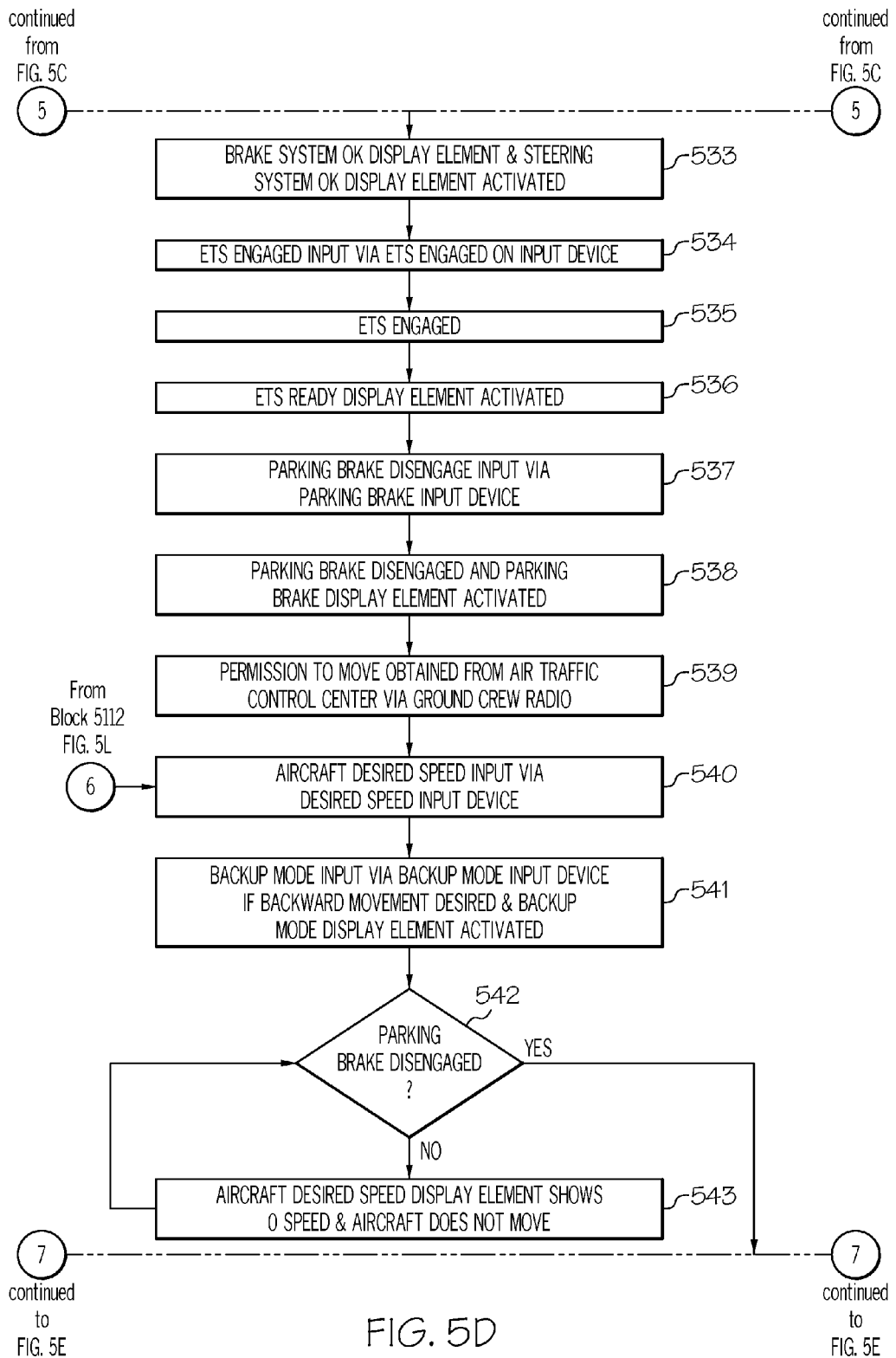
FIG. 5D is a flow chart of a fourth portion of a ground remote control method for an aircraft with an electric taxi system according to an exemplary embodiment of the present invention.

Referring now to FIG. 5D, a fourth portion of an exemplary ground remote control method 500 for the aircraft 102 with the ETS 118 is illustrated with a flow chart. When the braking system 120 and the steering system 126 have passed the self-test, the brake system ready display element 272 and the steering system ready element 274 may be activated (step 533). An ETS 118 engage input may be made on the ETS engage input device 282 (step 534). In response to the input, the GRCS controller 104 may send commands to engage any clutches or other mechanical devices to necessary to drivingly connect the ETS 118 to the wheels 146 of the landing gear assembly 144 (step 535). When the ETS 118 is engaged, the ETS ready display element 284 may be activated (step 536). A parking brake disengage input may be made on the parking brake input device 295 (step 537). In response to the input, the GRCS controller 104 may disengage the parking brake, and the parking brake display element 295 may be activated (step 538).

The person operating the GCC 148, for example a ground crew member 150, may request and receive permission from the air traffic control tower 166 to move the aircraft. Although other persons may operate the GCC 148, from here forward in the description, the person operating the GCC 148 will be referred to as the ground crew member 150, and this term is not to be taken as restricting the person operating the GCC to any particular station, job, or other category. The ground crew member 150 may make the request over the RF radio 214 included on the GCC 148, or through a separate radio or device (step 539). A desired speed input may be made through the desired speed input device 218 (step 540). A back-up mode input via the back-up mode input device 223 may be made if backward movement of the aircraft 102 is desired and the back-up mode display element is activated (step 541). The GRCS controller 104 may check if the parking brake is engaged (step 542), and if it is, the aircraft 102 will not move and the desired speed display element will indicate a zero (0) speed (step 543). The method 500 may continue to steps in FIG. 5E.

Figure 5E:
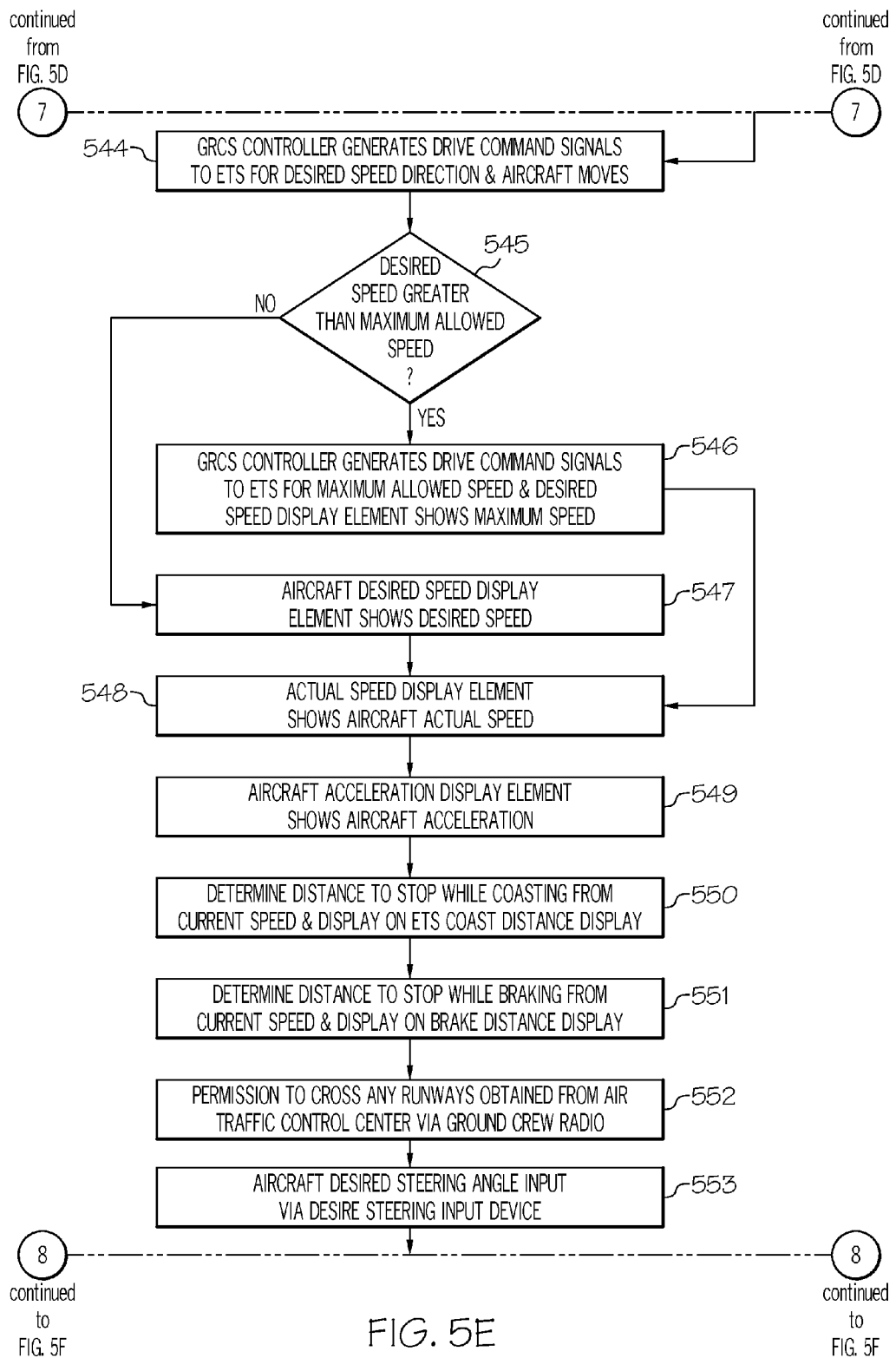
FIG. 5E is a flow chart of a fifth portion of a ground remote control method for an aircraft with an electric taxi system according to an exemplary embodiment of the present invention.

Referring now to FIG. 5E, a fifth portion of an exemplary ground remote control method 500 for the aircraft 102 with the ETS 118 is illustrated with a flow chart. If the parking brake is disengaged, the GRCS controller 104 may generate drive command signals to the ETS 118 indicative of the desired speed and direction, and the aircraft 102 may begin to move (step 544). The GRCS controller 104 may include a maximum allowed speed that the aircraft 102 should not exceed when being operated via a remote control device 145. The GRCS controller 104 may check if the desired speed is greater than the maximum allowed speed (step 545). If the desired speed is greater than the maximum allowed speed the GRCS controller 104 generates drive commands to operate the aircraft 102 at the maximum allowed speed, and the maximum speed may be displayed on the desired speed display element 218 (step 546). If the desired speed is less than or equal to the maximum allowed speed, the GRCS controller 104 continues to generate drive commands to operate the aircraft at the desired speed, and the desired speed may be displayed on the desired speed display element 218 (step 547). The GRCS controller may receive signals from the ETS 118, a GPS system (not shown), or a speed sensor, as known in the art, and determine the actual speed and acceleration of the aircraft 102. The actual speed display element 221 may display the actual speed of the aircraft 102 and the acceleration display element 222 may display the acceleration of the aircraft 102 (steps 548, 549).

The GRCS controller 104 may determine based on algorithms, tables, or other methods known in the art, the time it would take the aircraft 102 to reach a stop if the aircraft 102 were immediately to start coasting and receive no further motive power. The time it would take to stop the aircraft 102 may be displayed on the coast stop distance display element 242 (step 550). The GRCS controller 104 may determine based on algorithms, tables, or other methods known in the art, the time it would take the aircraft 102 to reach a stop if the all braking systems available were to provide maximum braking power. The time it would take to stop the aircraft 102 may be displayed on the brake stop distance display element 244 (step 551). The ground crew member 150 may request and receive permission from the air traffic control tower 166 to cross any runways as the aircraft 102 is being moved. The ground crew member 150 may make the request over the RF radio 214 included on the GCC 148, or through a separate radio or device (step 552).

A desired steering angle input may be made through the desired steering angle input device 226 (step 553). The method 500 may continue to steps in FIG. 5F.

Figure 5F:
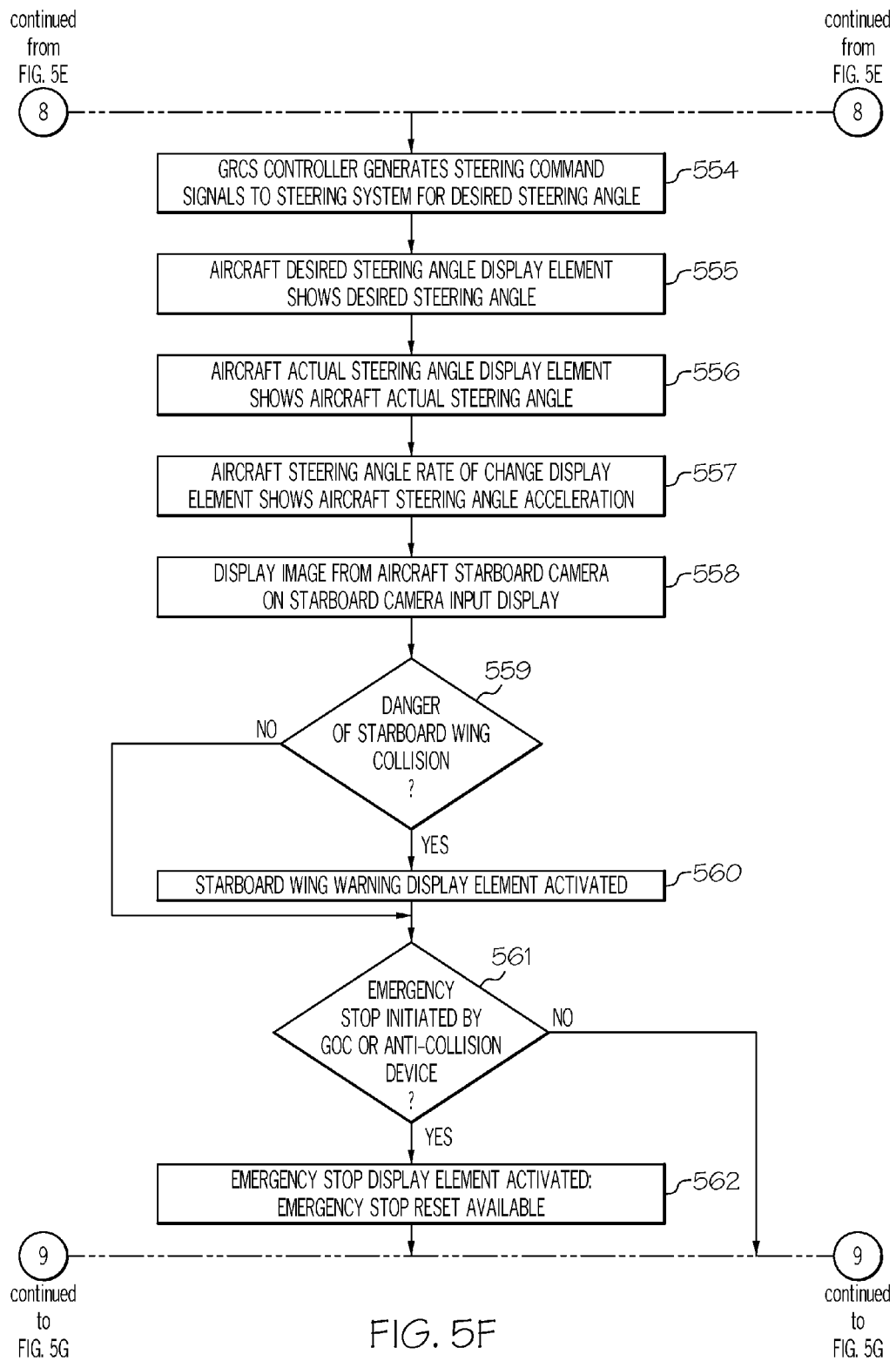
FIG. 5F is a flow chart of a sixth portion of a ground remote control method for an aircraft with an electric taxi system according to an exemplary embodiment of the present invention.

Referring now to FIG. 5F, a sixth portion of an exemplary ground remote control method 500 for the aircraft 102 with the ETS 118 is illustrated with a flow chart. The GRCS controller 104 may generate steering command signals to the steering system 126 indicative of the desired steering angle, and the aircraft 102 may steer in response to the commands (step 554). The desired steering angle may be displayed on the desired steering angle display element 226 (step 555). The GRCS controller may receive signals from a nose gear angle sensor, voltage or current signals from ETS 118 electric motors, or other steering angle sensor and determine the actual steering angle and steering angle rate of change of the aircraft 102. The actual steering display element 230 may display the actual steering angle of the aircraft 102 and the steering angle rate of change display element 232 may display the steering angle rate of change of the aircraft 102 (steps 556, 557).

Display images from the starboard wing camera 132 may be displayed in the starboard camera view display area 233 so the ground crew member 150 may be aware of obstacles while remotely operating the aircraft 102 (step 558). If there is a danger of a star board wing collision, a ground observer 154 (or other person) using the GOC 152 may input a starboard side warning. Additionally, the wing anti-collision system 134 may issue a starboard side warning (step 559). If a warning is issued the starboard wing warning display element 236 may be activated (step 560). To reset the warning display element 236, a reset warning input may be entered through the reset warning input device 240. If a collision on the starboard side may occur without an emergency stop of the aircraft 102, the ground observer 154 may initiate an emergency stop. Additionally the wing anti-collision system 134 may initiate an emergency stop (step 561). If an emergency stop is initiated the emergency stop display element 280 may be activated; and if the ground observer initiated the stop with the GOC 152, the observer initiated stop display element may be activated. To continue operating the aircraft remotely after an emergency stop, the emergency stop reset input may be made through the emergency stop reset input device 252 (step 562). The method 500 may continue to steps in FIG. 5G.

Figure 5G:
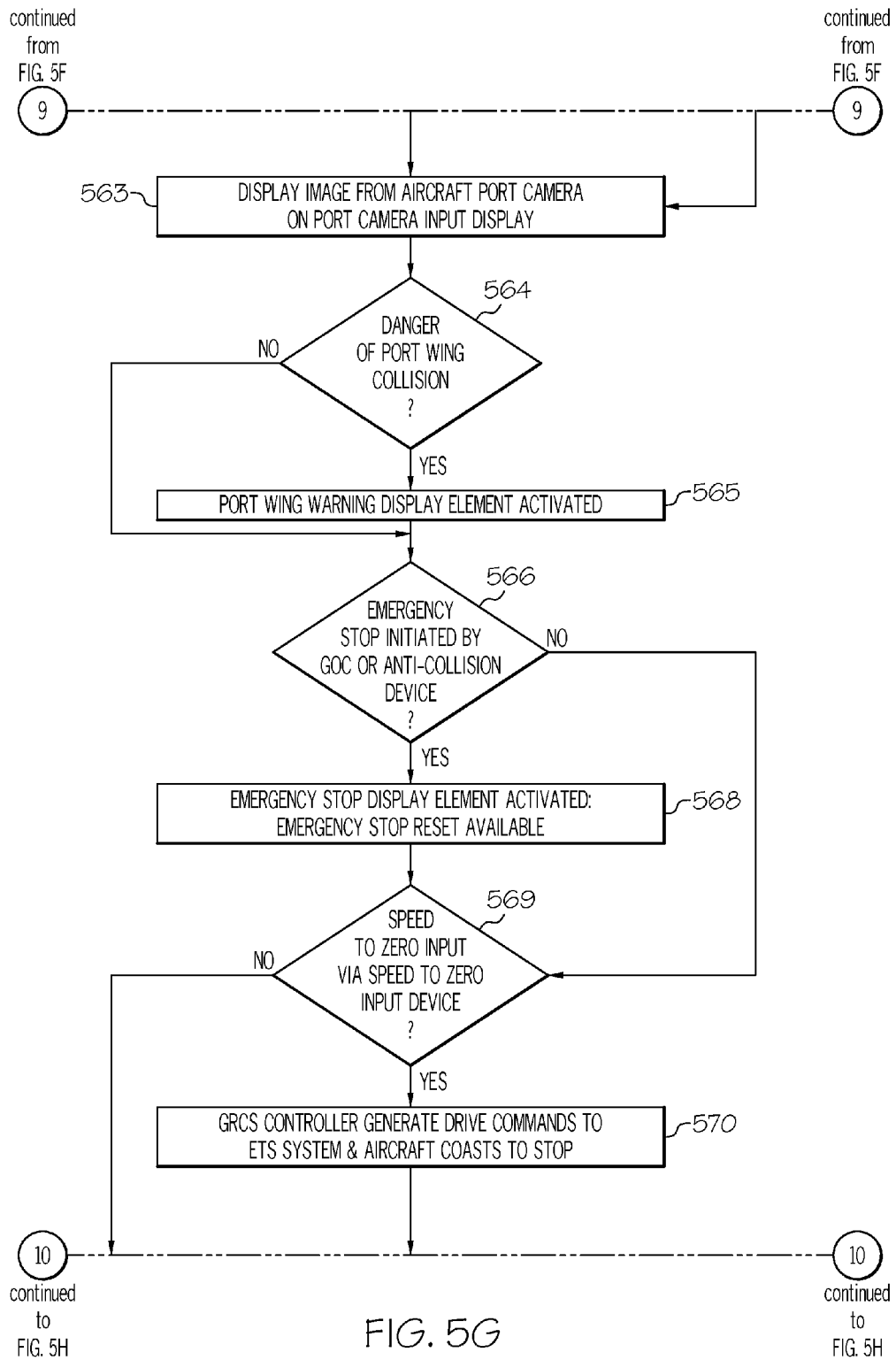
FIG. 5G is a flow chart of a seventh portion of a ground remote control method for an aircraft with an electric taxi system according to an exemplary embodiment of the present invention.

Referring now to FIG. 5G, a seventh portion of an exemplary ground remote control method 500 for the aircraft 102 with the ETS 118 is illustrated with a flow chart. Steps 563-567 in FIG. 5G are similar to steps 558-562 except they may occur on the port side of the aircraft 102, and will not be further described. The ground crew member 150 may desire to bring the aircraft 102 to a coast stop. A zero speed input may be made through the zero speed input device 224 (step 569). The GRCS controller 104 may generate drive commands indicating a zero desired speed and the ETS 118 may cease providing motive power to the aircraft 102, and the aircraft 102 may coast to a stop (step 570). The method 500 may continue to steps in FIG. 5H.

Figure 5H:
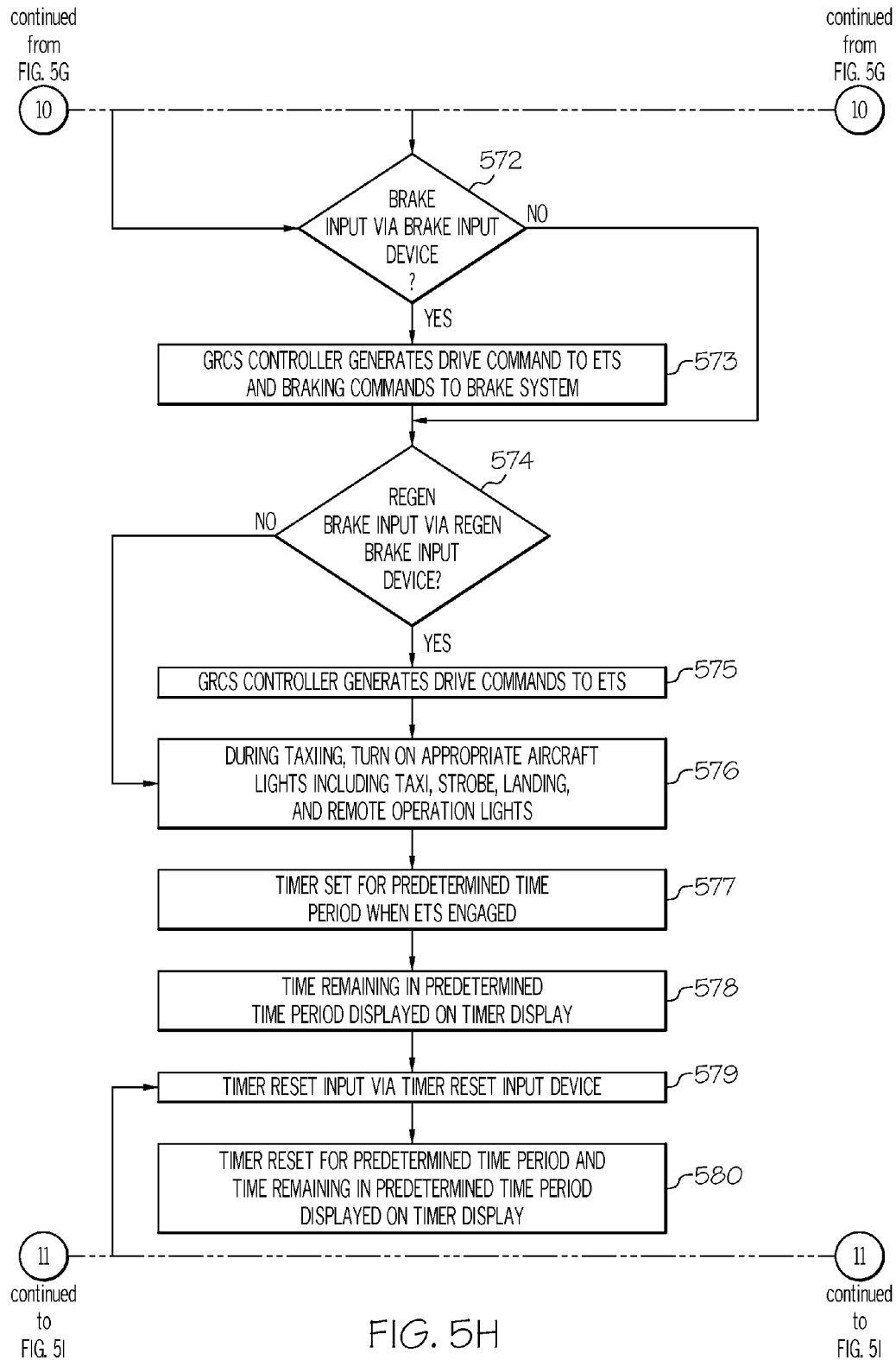
FIG. 5H is a flow chart of a eighth portion of a ground remote control method for an aircraft with an electric taxi system according to an exemplary embodiment of the present invention.

Referring now to FIG. 5H, an eighth portion of an exemplary ground remote control method 500 for the aircraft 102 with the ETS 118 is illustrated with a flow chart. In some cases, the ground crew member 150 may desire that the aircraft 102 be brought to a stop with the braking system 120. A brake input may be made through the brake input device 288 (step 572). The GRCS controller 104 may generate drive commands and braking commands indicating a zero desired speed; the ETS 118 may cease providing motive power to the aircraft 102; the braking system may activate the brakes on the aircraft wheels 146; and the aircraft 102 may come to a stop (step 573). Using the regenerative braking capability of the ETS 118 may increase the fuel economy of the aircraft 102, and decrease the wear on the braking system 120. The ground crew member 150 may desire that the aircraft 102 be brought to a stop using regenerative braking from the ETS 118 system. A regenerative braking input may be made through the regenerative brake only input device 290 (step 574). The GRCS controller 104 may generate drive commands indicating that regenerative braking is desired, and the ETS 118 may operate the electric motors/generators in regenerative braking mode, and the aircraft 102 may come to a stop (step 575).

The ground crew member 150 may turn on appropriate lights on the aircraft 102 while moving the aircraft 102, including the landing lights, taxi lights (not shown), the strobe lights (not shown), and/or remote operation lights 136. The landing lights may be turned on and off with inputs to the landing lights on input device 262. The taxi lights may be turned on and off with inputs to the taxi lights on input device 264. The taxi strobe lights may be turned on and off with inputs to the taxi strobe lights on input device 266. The remote operation lights 136 may be turned on and off with inputs to the remote operations lights on input device 268 (step 576). Different embodiments of the aircraft 102 may include different combinations of lights. Some aircraft 102 may include all the lights described above. Other aircraft may include different combinations of fewer than all the lights described above.

The GCC 148 may be equipped with a timer (or alternatively the timer may be included in the GRCS controller 104 and/or SPD 106 and signals transmitted and received by the GCC 148); which may turn the GCC 148 off and shut down remote operations, if no inputs are made to the GCC 148 for a predetermined time period after the ETS 118 is engaged. This may prevent unintended remote operations of the aircraft 102. The timer may be set when the ETS 118 is engaged. The remaining time in the time period may be displayed through the timer display element 292 (step 578). The ground crew member 150 may reset the timer with the timer reset input device 294 (step 579) and the time remaining in the reset predetermined time period may be displayed in the timer display element 292 (step 580). The method 500 may continue to steps in FIG. 5I.

Figure 5I:
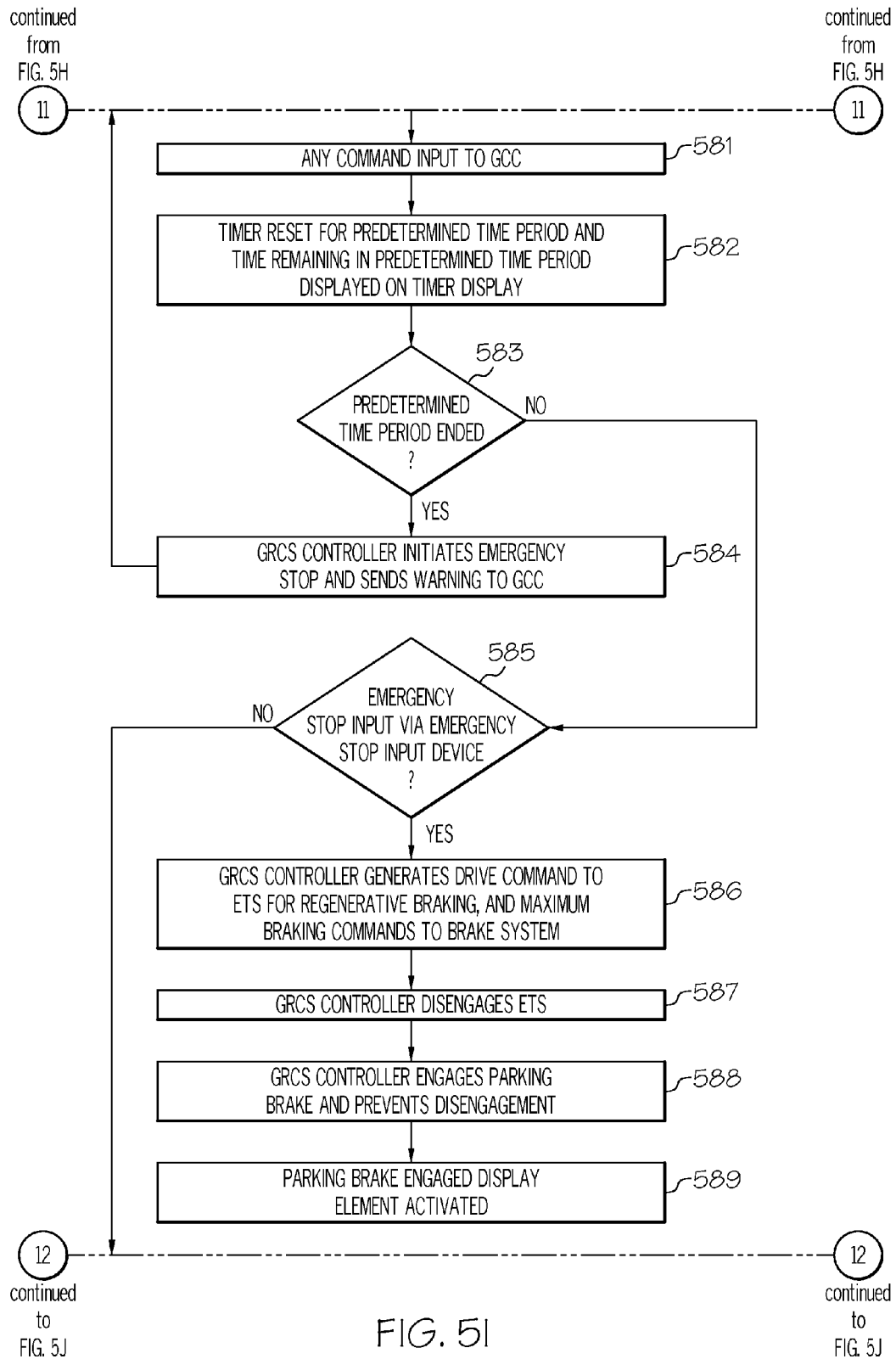
FIG. 5I is a flow chart of a ninth portion of a ground remote control method for an aircraft with an electric taxi system according to an exemplary embodiment of the present invention.

Referring now to FIG. 5I, a ninth portion of an exemplary ground remote control method 500 for the aircraft 102 with the ETS 118 is illustrated with a flow chart. If an input is made to the GCC 148 (step 581), the timer may also be reset, and the time remaining in the reset predetermined time period may be displayed in the timer display element 292 (step 582). If the predetermined time period elapses without being reset or an input being made to the GCC 148, the GRCS controller 104 may initiate an emergency stop and a warning may be displayed on the GCC 148. A ground crew member 150 may then reset the time period to enable remote control of the aircraft 102 again (steps 583, 584).

The ground crew member 150 may desire to bring the aircraft 102 to an emergency stop using all braking power including, but not limited to, the braking system 120, and regenerative braking from the ETS 118. The ground crew may enter an emergency stop input through the emergency stop input device 280, and the GRCS controller 104 may generate drive commands to the ETS 118 for regenerative braking, and braking commands to the braking system 120 for maximum braking (steps 585 586). The GRCS controller 104 may then disengage the ETS 118 (step 587), and engage the parking brake, and lock the parking brake to prevent disengagement (step, 588). The parking brake display element 295 may be activated (step 589). The method 500 may continue to steps in FIG. 5J.

Figure 5J:
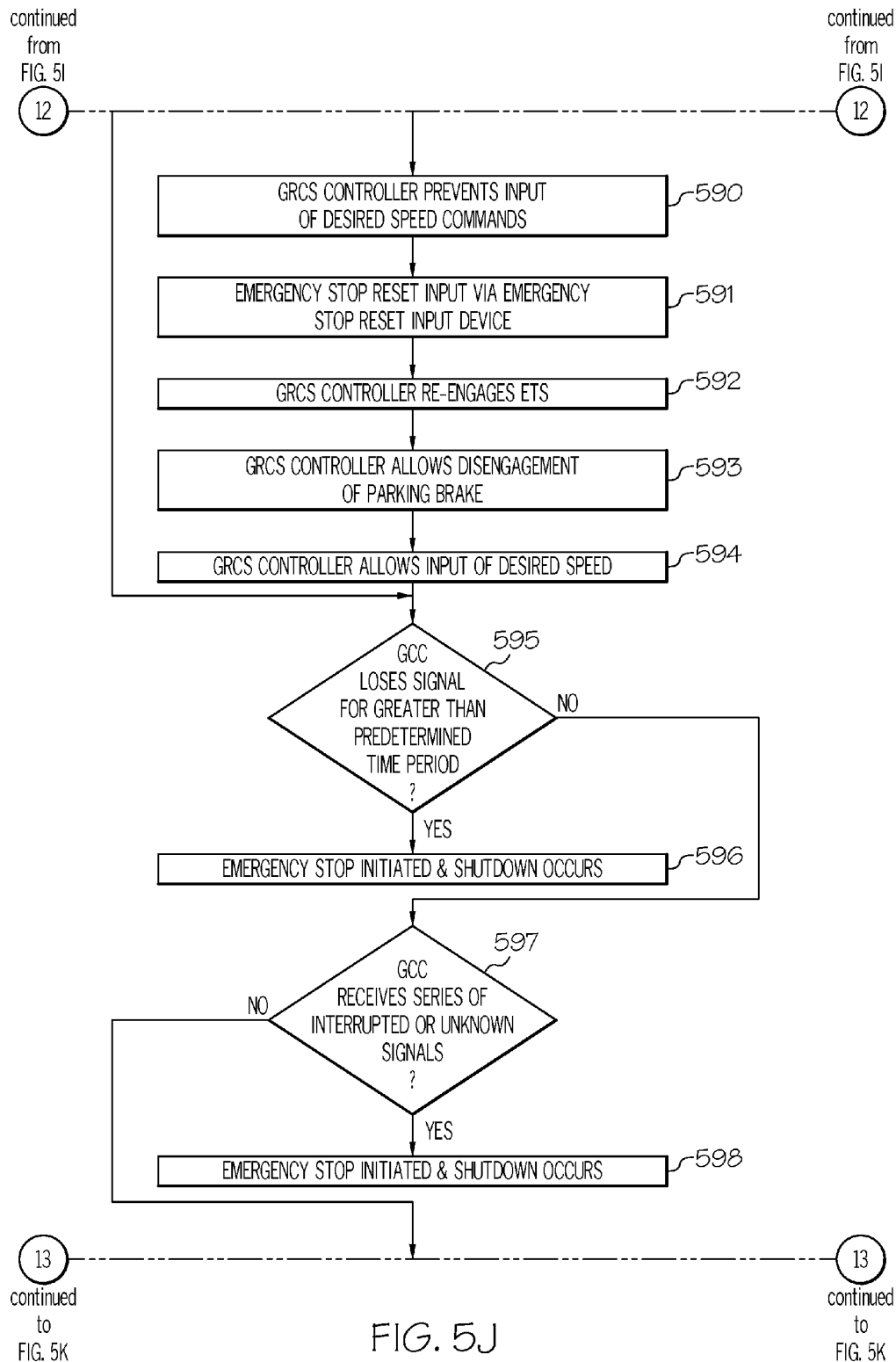
FIG. 5J is a flow chart of a tenth portion of a ground remote control method for an aircraft with an electric taxi system according to an exemplary embodiment of the present invention.

Referring now to FIG. 5J, a tenth portion of an exemplary ground remote control method 500 for the aircraft 102 with the ETS 118 is illustrated with a flow chart. The GRCS controller 104 may prevent input of any desired speed commands (step 590). If the ground crew member 150 desired to operate the aircraft 102 with the GCC 148 after an emergency stop, the ground crew member 150 may enter an emergency stop reset input through the emergency stop reset input device 252 (step 591). In response to the emergency stop reset, the GRCS controller 104 may reset the clutch to the ETS 118 (step 592); allow disengagement of the parking brake (step 593); and/or allow input of desired speeds (step 594).

Methods and procedures to ensure secure communication between the GCC 148 and the GRCS controller 104 may be programmed into the GRSC controller 104. If the GCC 148 loses the signal from the SPD 106 for greater than a predetermined time period, the GRCS controller 104 may initiate an emergency stop of the aircraft 102, and shut down the aircraft 102 (steps 595, 596). If the GCC 148 receives a series of interrupted or unknown signals, the GRCS controller 104 may initiate an emergency stop of the aircraft 102, and shut down the aircraft 102 (steps 597, 598). The method 500 may continue to steps in FIG. 5K.

Figure 5K:
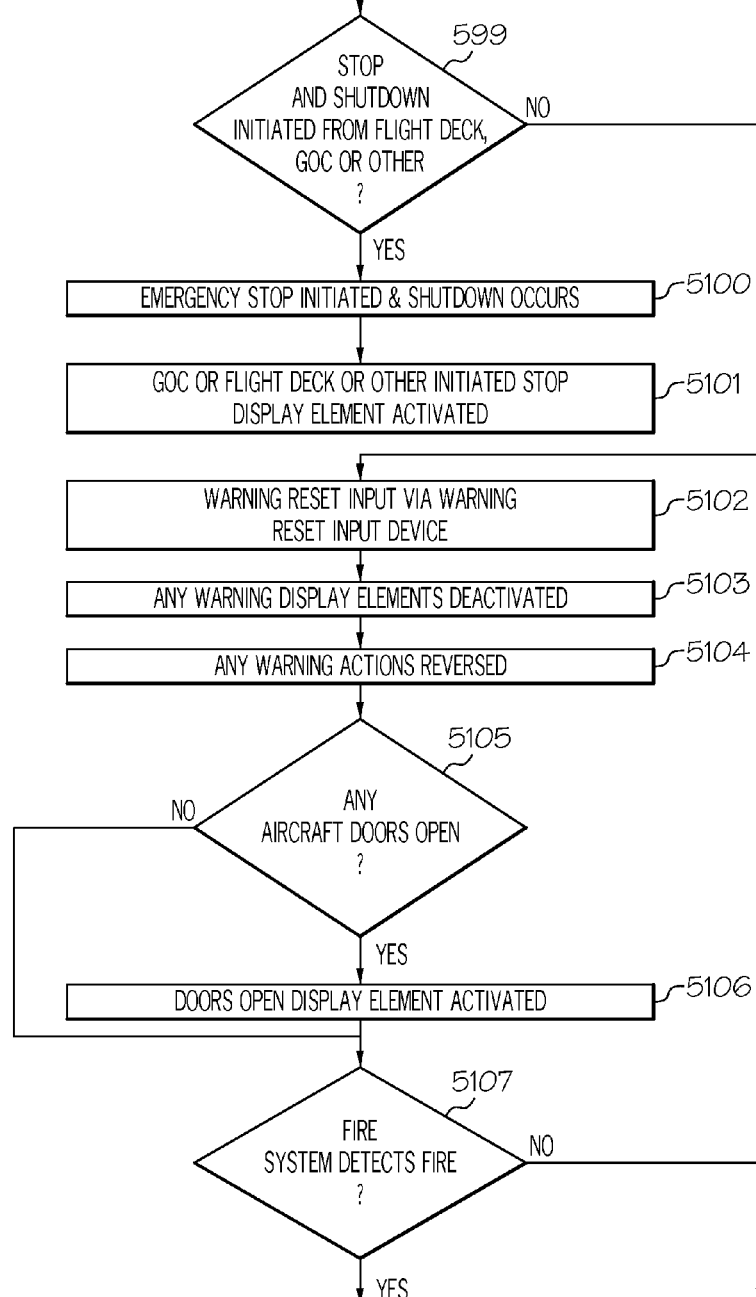
FIG. 5K is a flow chart of a eleventh portion of a ground remote control method for an aircraft with an electric taxi system according to an exemplary embodiment of the present invention.

Referring now to FIG. 5K, an eleventh portion of an exemplary ground remote control method 500 for the aircraft 102 with the ETS 118 is illustrated with a flow chart. To ensure against collisions, an emergency stop and/or shut-down of the aircraft 102 may be initiated from the GOC 152; and/or the flight deck 108 through the aircraft remote control user interface 110. If the GOC 152, the flight deck 108, and/or another source initiates an emergency stop and/or shut-down of the aircraft 102, the GRCS controller 104 may bring the aircraft 102 to an emergency stop, and/or shut down the aircraft 102; and the observer initiated stop display element 238 and/or the flight deck initiated shut-down display element 278 may be activated (steps 599, 5010, 5011).

If the ground crew member 150 has received a warning from a warning display device on the GCC 148, the ground crew member 150 may reset one or more warnings through an input to the reset warning input device 240 (step 5102). In response to the reset warning input, any warning display elements may be deactivated, and any actions taken in response to the one or more warnings may be reversed (steps 5103, 5104). The GRCS controller 104 may receive signals from systems on the aircraft 102 that indicate that a door on the aircraft 102 is open. In response to the signals the door open display element 260 may be activated (steps 5105, 5106). The fire suppression system 178 may detect a fire on the aircraft 102 (step 5107). The method 500 may continue to steps in FIG. 5L.

Figure 5L:
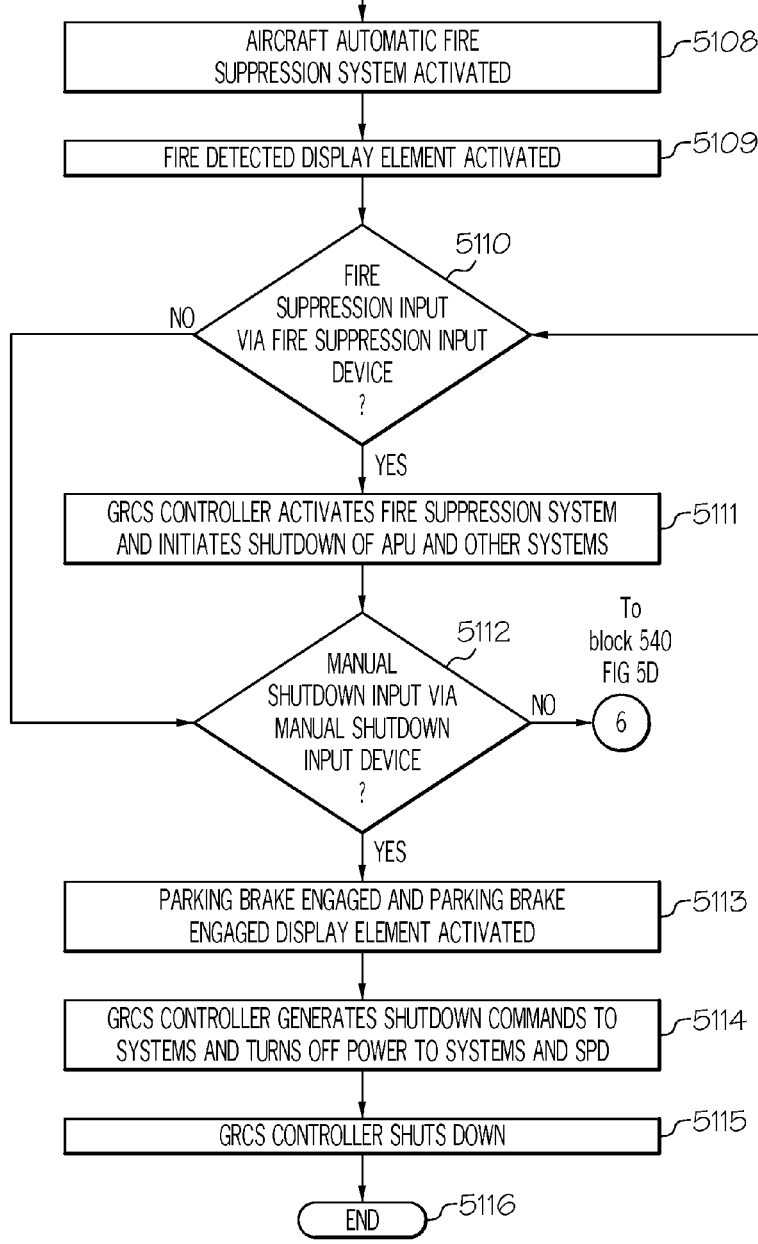
FIG. 5L is a flow chart of a twelfth portion of a ground remote control method for an aircraft with an electric taxi system according to an exemplary embodiment of the present invention.

Referring now to FIG. 5L, a twelfth portion of an exemplary ground remote control method 500 for the aircraft 102 with the ETS 118 is illustrated with a flow chart. If the fire suppression system 178 detects a fire on the aircraft 102, the aircraft fire suppression system 178 may be activated to extinguish the fire (step 5108), and the fire detected display element 256 may be activated (step 5109). In addition to the automatic fire suppression system 178 on the aircraft, the ground crew member 150 may initiate the fire suppression system 178 being activated to extinguish a fire, through an input to the manual fire suppression input device 258 (step 5110) on the GCC 148. In response to the fire suppression input, the GRSC controller 104 may activate (step 5111) the fire suppression system 178, and shut-down the APU 170 and other aircraft 102 systems (step 5111). If the ground crew member 150 desired to shut-down the aircraft 102, the ground crew member 150 may make an input through the manual initiated shut-down input device (step 5112). In response to the input, the GRCS controller 104 may engage the parking brake; the parking brake display element 295 may be activated (step 5113); and the GRCS may shut-down the APU 170 and other aircraft 102 systems, turn off power to the systems, and SPD (step 5114), and shut itself down (step 5115). The method 500 may end at 5116.

Figure 6A:
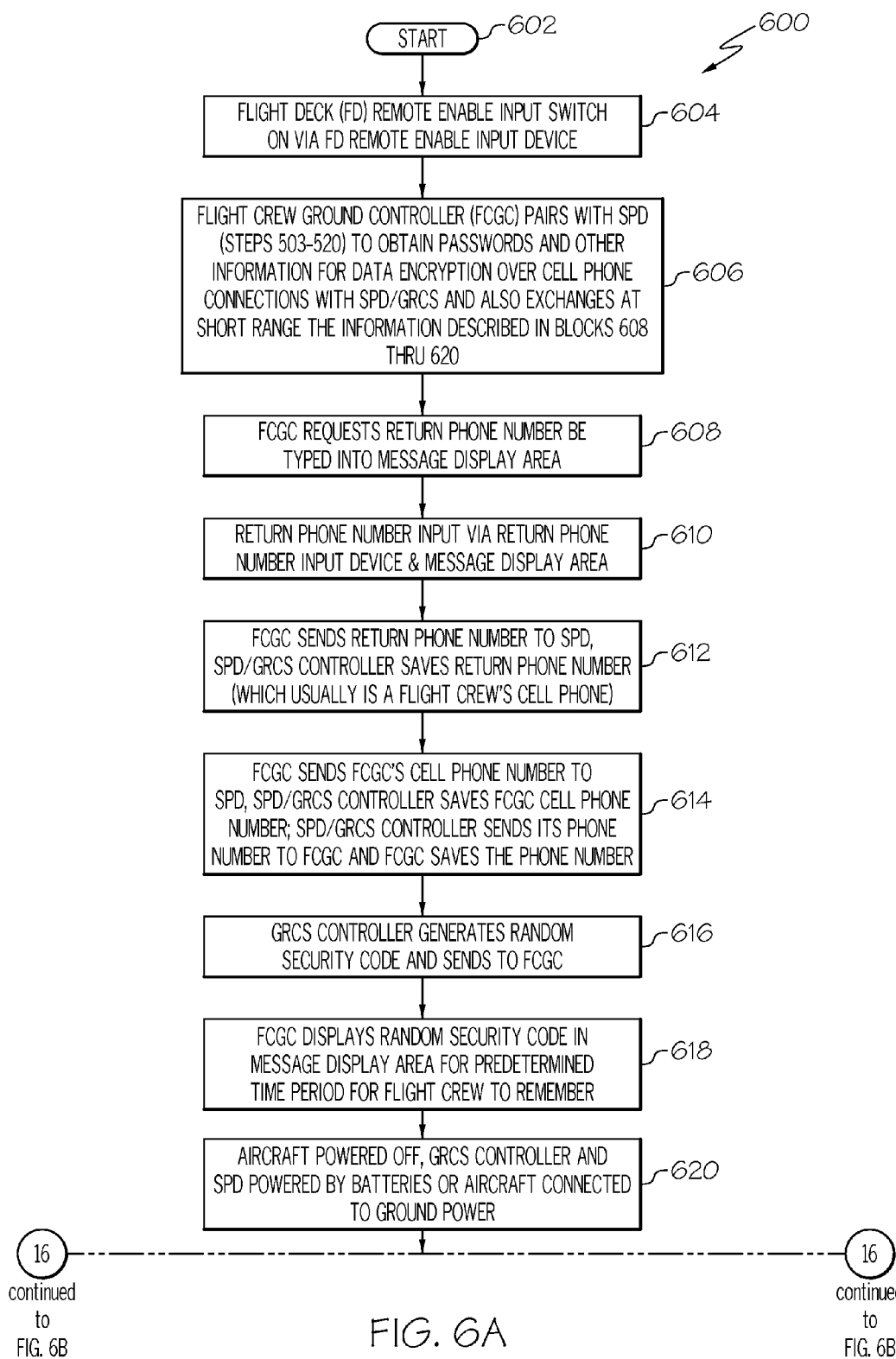
FIG. 6A is a flow chart of a first portion of a method to remotely start systems on an aircraft on the ground with an electric taxi system according to an exemplary embodiment of the present invention.

Referring now to FIG. 6A, a first portion of an exemplary method 600 to remotely start systems on the aircraft 102 on the ground is illustrated with a flow chart. The aircraft 102 may or may not include the ETS 118. The method begins at 602. Method 600 may be referred to as the "Hotel Method" as it may be appropriate for business aircraft flight crew who overnight in hotels but park the aircraft 102 where there is limited or no ground crew. When the pilot, crew, or other person leaves the flight deck of the aircraft 102, they may turn the remote control on/off selector 298 to the "on" position, and the remote control enabled display element may be activated (step 604). A flight crew member may pair the remote control device 145, for example the FCGC 156 to the SPD 106, and may use the method described in relation to method 500 in steps 503-520 (step 606). These steps will not be further described. Although other persons may operate the FCGC 156, from here forward in the description, the person operating the FCGC 156 will be referred to as the flight crew member, and this term is not to be taken as restricting the person operating the FCGC 156 to any particular station, job, or other category. In addition to the pairing steps 503-520, the FCGC may display a request to the flight crew member in the display and user interface 300 to enter a return phone number (step 608). The flight crew member may enter a return phone number, usually a hotel phone number or a flight crew's cell phone number, on the display and user interface 300 from which he/she may call the SPD 106 and/or GRCS controller 104 when ready to begin remote activation of aircraft 102 systems (step 610). The FCFC 156 may send the return phone number to the SPD 106 and/or GRCS controller 104 and the SPD 106 and/or GRCS controller 104 may save the return phone number in a memory component (step 612).

The SPD 106 and/or GRCS controller 104 may send the FCGC 156 a cell phone number through which the SPD 106 and/or GRCS controller 104 may send and receive wireless communication to/from the FCGC 156 (step 614). Likewise, the FCGC 156 provides to the SPD106/GRCS controller 104 its' phone number. In alternative embodiments where wireless communication may be desired through other than cell phone communication methods, information on how to connect with the SPD 106 and/or GRCS controller 104 through the alternative wireless communication method may alternatively be sent to the FCGC 156. The SPD 106 and/or GRCS controller 104 may generate a random security code and send it to the FCGC 156 (step 616). The FCGC 156 may display the random security code in the display and user interface 300 for a predetermined time period for the flight crew member to memorize or record (step 618). The aircraft 102 may then be shut-down and powered off, while the SPD 106 and GRCS controller 104 remain powered by the back-up power source 114, or by ground power supplied to the aircraft 102 (step 620). The method 600 may continue to steps in FIG. 6B.

Figure 6B:
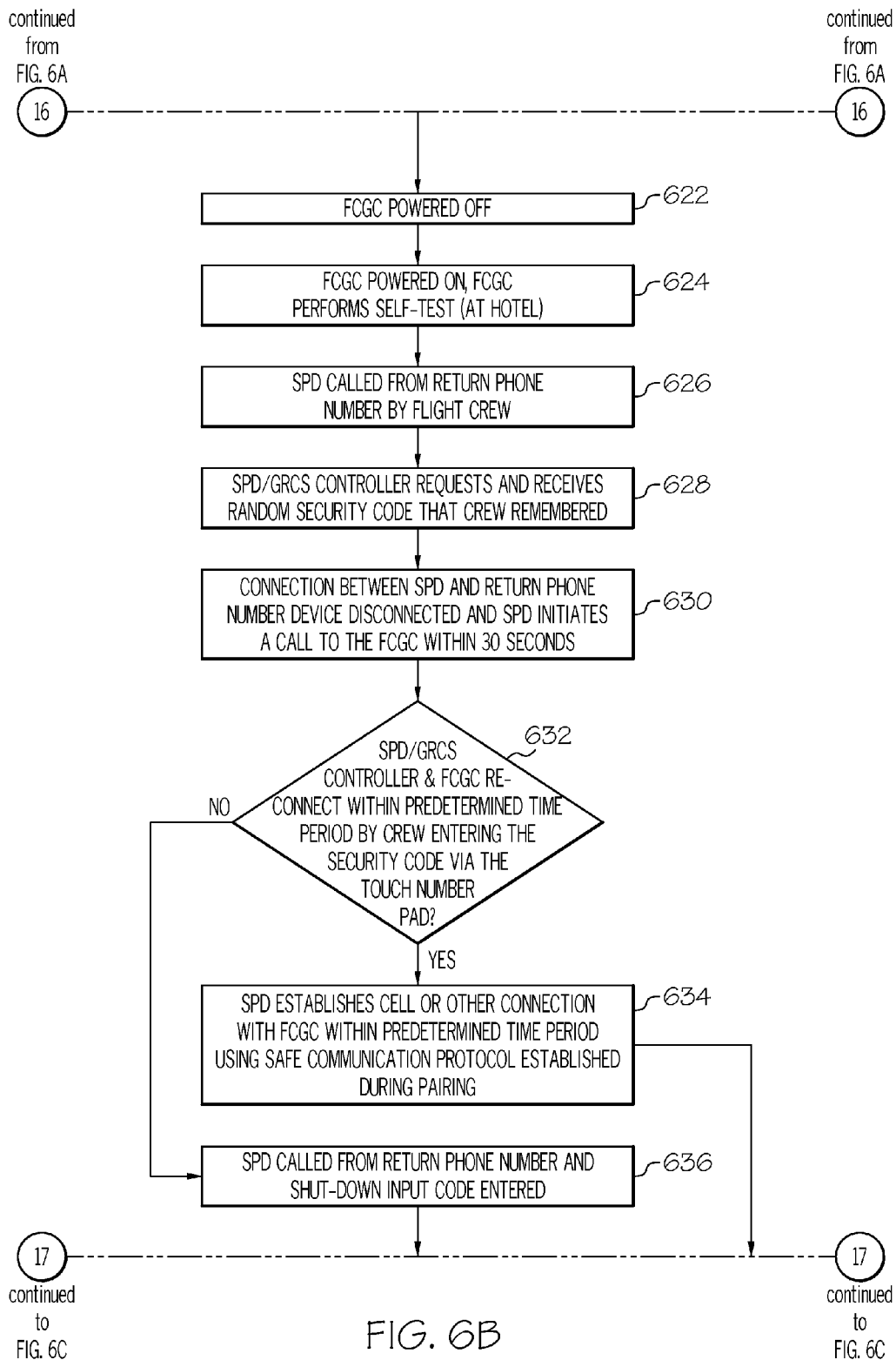
FIG. 6B is a flow chart of a second portion of a method to remotely start systems on an aircraft on the ground with an electric taxi system according to an exemplary embodiment of the present invention.

Referring now to FIG. 6B, a second portion of an exemplary method 600 to remotely start systems on the aircraft 102 on the ground is illustrated with a flow chart. The FCGC 156 may be powered off (step 622). The flight crew member may then go to an off-site location 158, for example, a hotel 160. It may be desired to start some systems on the aircraft 102, such as, for example, the air conditioning system 122, the heating system 124, and/or the temperature control system 176, a time period before the flight crew member and/or other people board the aircraft 102 for a flight. In this way, at least a part of the inside of the aircraft 102 may be at a temperate temperature, and other systems such as for example, the fire suppression system 178, may already have been started and may have completed self-tests, such that the aircraft 102 can begin a flight in a shorter time period.

From the off-site location 158, the flight crew member may power the FCGC 156 on and the FCGC may perform a self-test (steps 622, 624). The flight crew member may call the SPD 106 cell phone number from a device with the return phone number (step 626) such as his/her private cell phone. The SPD 106 may monitor the incoming calling number and may only answer the previously entered return phone number. The SPD 106 and/or GRCS controller 104 may request from the flight crew member the random security code during the call, and the flight crew member may say or punch in, and the SPD 106 and/or GRCS controller 104 may receive, the random security code (step 628). The connection between the device and the SPD 106 and/or GRCS controller 104 may be then be disconnected (step 630).

The SPD 106 and/or GRCS controller 104 may then establish a connection with the FCGC 156 within a predetermined period of time by calling the FCGC's 156 cell phone, and requiring that the crew again say or punch in the security code, and using the safe communication protocol established during the pairing of the FCGC 156 and the SPD 106 and/or GRCS controller 104 (steps 632, 634). If the connection between the SPD 106 and/or GRCS controller 104 and the FCGC 156 is not established within the predetermined time period for a limited number of attempts, the flight crew member may call the SPD 106 from the device with the return phone number and enter a shut-down input (step 636). The method 600 may continue to steps in FIG. 6C.

Figure 6C:
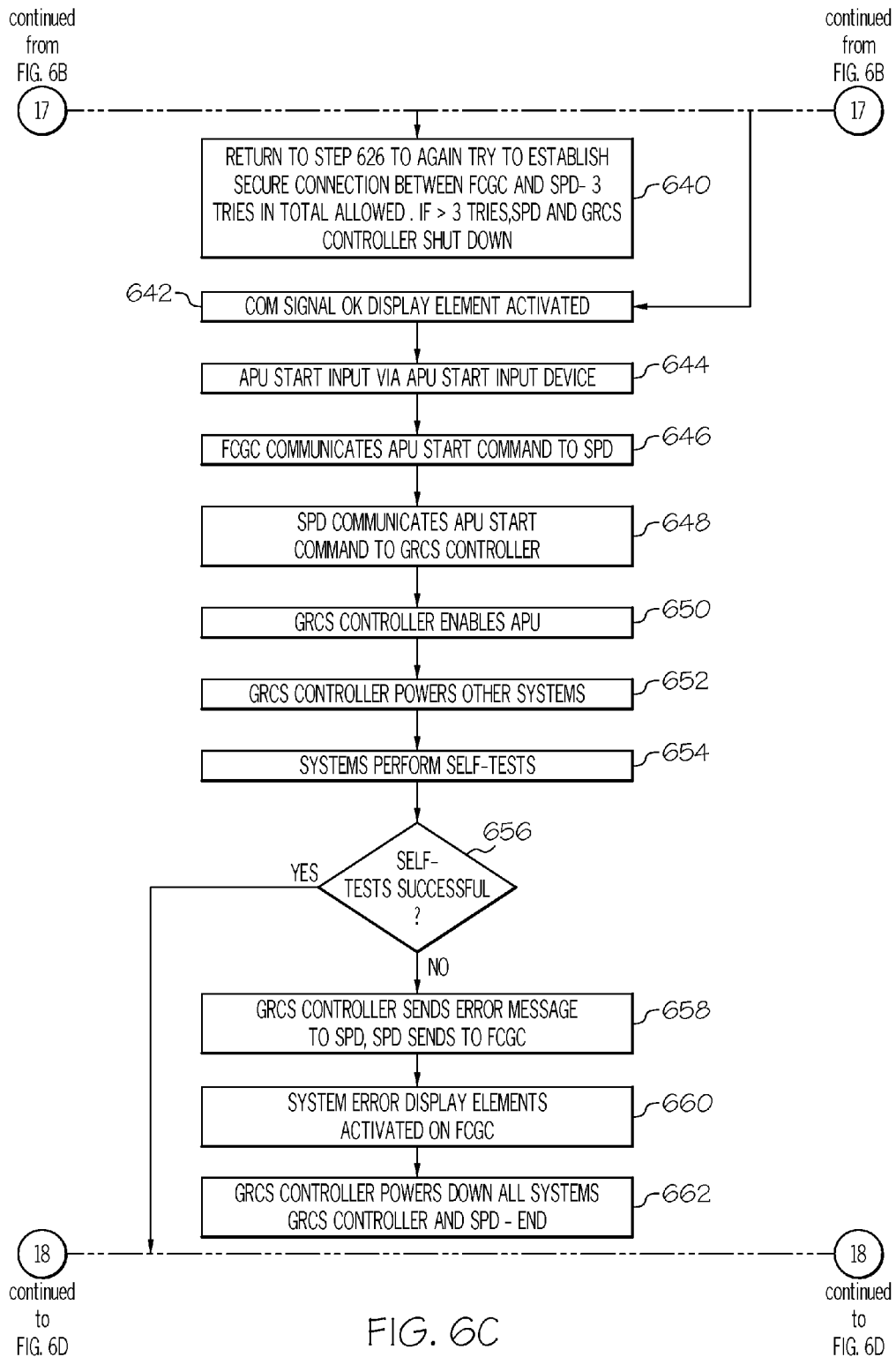
FIG. 6C is a flow chart of a third portion of a method to remotely start systems on an aircraft on the ground with an electric taxi system according to an exemplary embodiment of the present invention.

Referring now to FIG. 6C, a third portion of an exemplary method 600 to remotely start systems on the aircraft 102 on the ground is illustrated with a flow chart. Then the SPD 106 and/or GRCS controller 104 may shut-down. If the flight crew member desires to try to establish a connection between the FCGC 156 and the SPD 106 and/or GRCS controller 104 again, steps 626-634 may be repeated (step 640). When the connection between the FCGC 156 and the SPD 106 and/or GRCS controller 104 is established, the communication link enabled display element 248 may be activated (step 642)

Figure 6D:
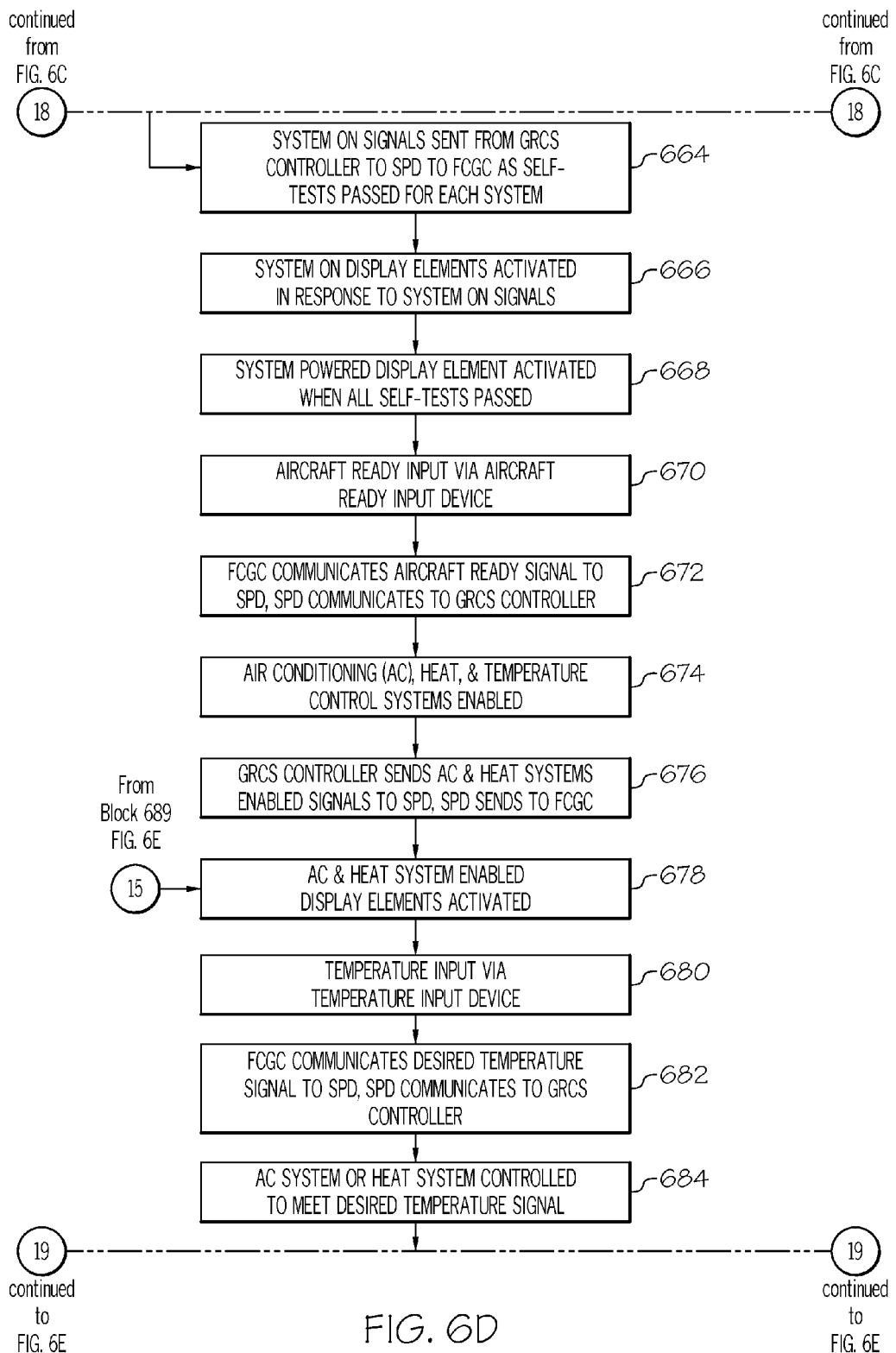
FIG. 6D is a flow chart of a fourth portion of a method to remotely start systems on an aircraft on the ground with an electric taxi system according to an exemplary embodiment of the present invention.

To begin to activate some aircraft 102 systems with the FCGC 156, the flight crew member may make an APU start input through the APU start input device 250 (step 644). Steps 646-668, beginning in FIG. 6C and continuing into FIG. 6D, are similar to steps 524-530 in FIG. 5C, and will not be further described. The method 600 may continue to steps in FIG. 6D.

Referring now to FIG. 6D, a fourth portion of an exemplary method 600 to remotely start systems on the aircraft 102 on the ground is illustrated with a flow chart. When all self-tests are passed, the flight crew member may make an aircraft ready input via the aircraft ready input device 270 (step 670). The FCGC 156 may communicate to the SPD 106 and/or GRCS controller 104 the aircraft ready input and the GRCS controller 104 may enable the air conditioning system 122, the heating system 124, and the temperature control system 176 (step 674). When the air conditioning system 122, the heating system 124, and the temperature control system 176 are enabled, the SPD 106 and/or GRCS controller 104 may send an enabled signal to the FCGC 156 (step 676), and the AC display element 302 and the heat system display element 304 may be activated (step 678). The flight crew member may enter a desired temperature through the desired temperature input device 306 and the FCGC 156 may communicate the desired temperature to the SPD 106 and/or GRCS controller 104 (step 682). The GRCS controller 104 may generate commands to the air conditioning system 122, the heating system 124, and the temperature control system 176 such that the temperature in at least part of the aircraft 102 is controlled to be in a range around the desired temperature (step 684). The method 600 may continue to steps in FIG. 6E.

Figure 6E:
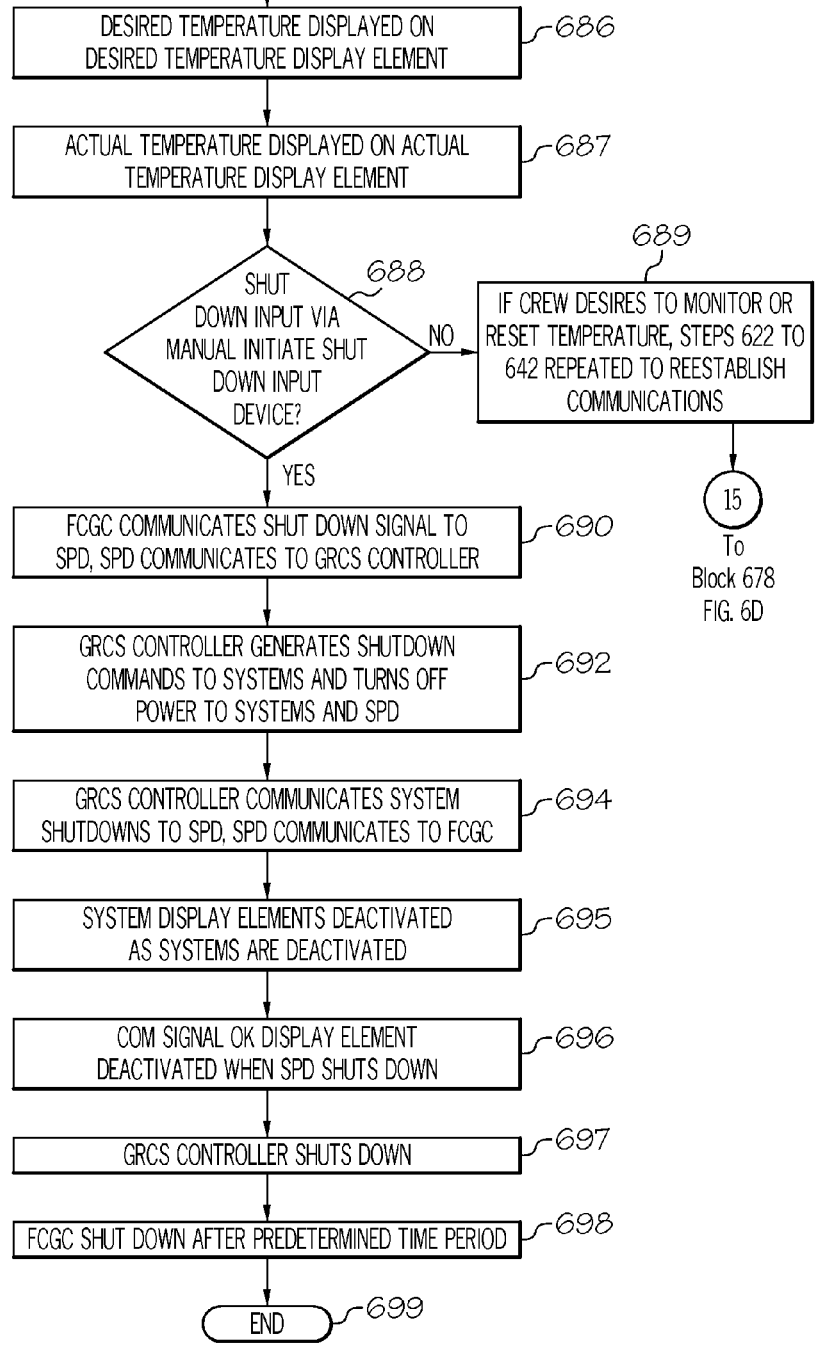
FIG. 6E is a flow chart of a fifth portion of a method to remotely start systems on an aircraft on the ground with an electric taxi system according to an exemplary embodiment of the present invention.

Referring now to FIG. 6E, a fifth portion of an exemplary method 600 to remotely start systems on the aircraft 102 on the ground is illustrated with a flow chart. The desired temperature may be displayed in through the desired temperature display element 306 (step 686) and the actual temperature may be displayed in the actual temperature display element 310 (step 687). The flight crew member may desire to shut-down the systems activated on the aircraft 102, from the off-site location. The flight crew member may make a shut-down input through the manual initiated shut-down input device 276 (step 688); and the FCGC 156 may communicate the manual shut-down input to the SPD 106 and/or GRCS controller 104 (step 690).

Alternatively, a member of the flight crew may desire to monitor or reset the temperature in the aircraft 102, but may need to reestablish communication with the SPD 106 and/or GRSC controller 104. Steps 622 to 642 may be performed to reestablish the communication and the method 600 may return to block 678 (step 689).

The GRCS controller 104 may generate commands to all active aircraft 102 systems such that the systems shut-down and the power to the systems is disconnected. The GRCS controller 104 may shut-down the APU 170, and the SPD 106 (step 692). As the aircraft 102 system shut down, the SPD 106 and/or GRCS controller 104 may communicate the shut-downs to the FCGC 156 (step 694); and the system display elements 254, 302, 304 may be deactivated as the systems shut-down (step 695). The communication link enabled display device 248 may be deactivated in response to the SPD 106 shutting down (step 696). The GRCS controller 104 may then shut-down (step 697). The FCGC 156 may shut down after a predetermined time period, after the SPD 106 shuts down and the communication link is disabled (step 698). The method ends at step 699.

Figure 7A:
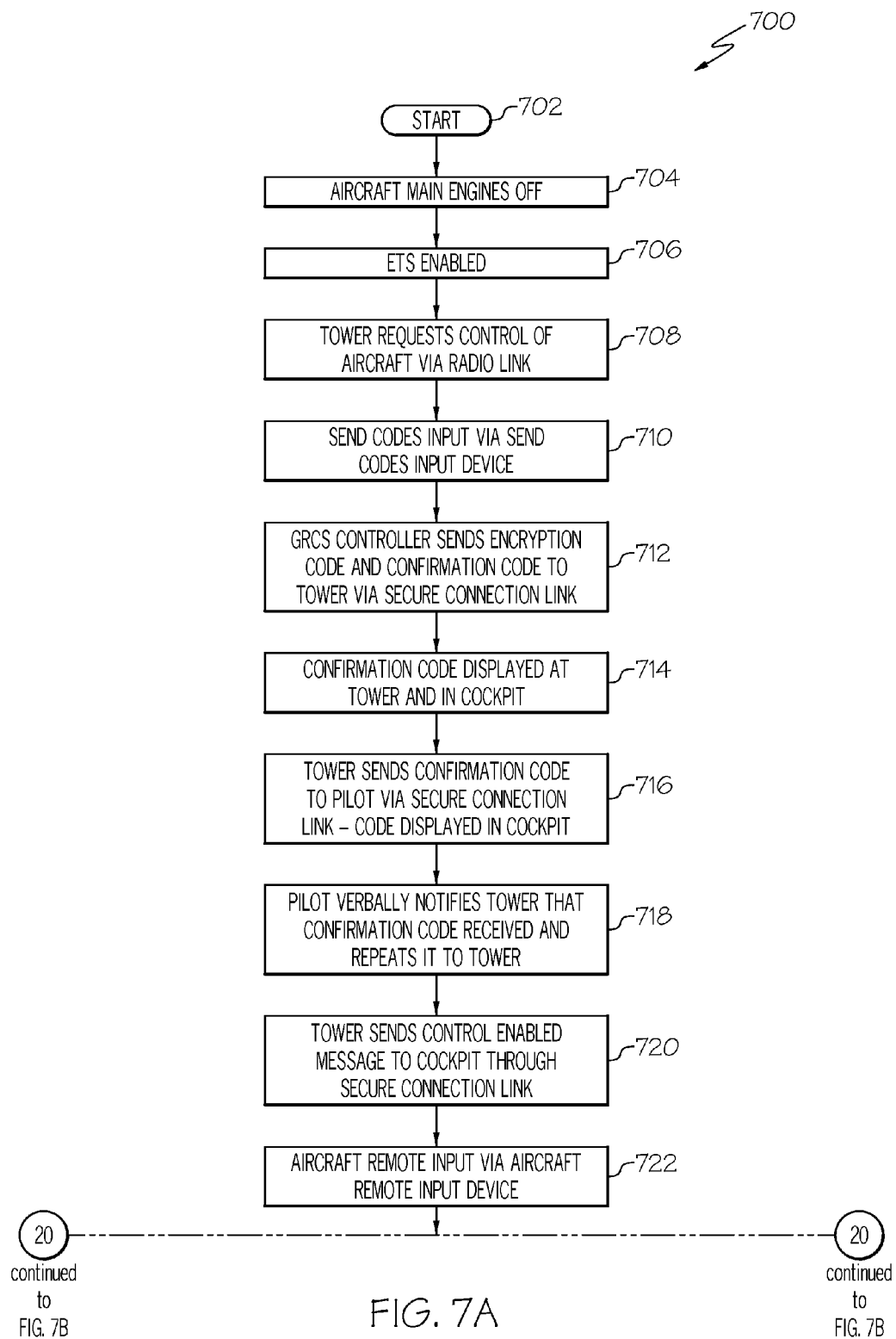
FIG. 7A is a flow chart of a first portion of a second embodiment of a ground remote control method for an aircraft with an electric taxi system according to an exemplary embodiment of the present invention.

Referring now to FIG. 7A, a first portion of a second embodiment of an exemplary ground remote control method 700 for the aircraft 102 with the ETS 118 is illustrated in a flow chart. The pilot and/or a crew member of the aircraft 102 may desire to relinquish control of the aircraft 102, while the aircraft is on the ground, perhaps at an airport, to a person (or persons) at a remote location 164, who have direct sight of the aircraft 102 and obstacles, other aircraft, and the area around the aircraft 102. For example, the pilot and/or a crew member of the aircraft 102 may desire to relinquish control of the aircraft 102 to an air traffic controller at an air traffic control tower 166 or to a central maintenance control system. Although control of the aircraft 102 may be relinquished to other persons, from here forward in the description, the person to whom control of the aircraft 102 will be, is being, or may be in the future relinquished to will be referred to as the air traffic controller, and this term is not to be taken as restrictive to any particular station, job, or other category. Although the aircraft 102 may be controlled from other remote locations 164, the remote location 164 will be referred to as the air traffic control tower 166 from here forward in the description.

The air traffic control tower 166 may include the remote control device 145, for example the ROC 162. The aircraft 102 may be controlled similarly to method 500 described in relation to FIGS. 5A-5L, except a GOC 152 and ground observer may not be present, and thus a warning or emergency shut-down from the GOC 152 would not be initiated or display element activated in response to the shut-down. The method 700 may not include starting and self-testing aircraft 102 systems as the pilot and/or crew may relinquish control of the aircraft 102 with the systems already operating. The establishment of communications between the SPD 106 and/or GRCS controller 104 with the ROC 162 may be different than method 500 as may the relinquishment of control from the ROC 162 back to the flight deck 108. Thus the establishment of communications and the relinquishment of control will be described in relation to FIG. 7, and not the control already described in relation to FIGS. 5A-5L.

The method begins at 702. The pilot and/or crew member of the aircraft 102 may turn the aircraft 102 main engines off (step 704); and enable the ETS 118 (step 706) when the aircraft 102 is on the ground and taxiing. This may increase the fuel efficiency of the aircraft 102. An air traffic controller at the air traffic control tower 166 may request control of the aircraft via a radio link (step 708). The request and other communications between the aircraft 102 and the air traffic control tower 166 may, for example, be through Controller Pilot Data Link Communications (CPDLC) or Aeronautical Mobile Airport Communications System (AeroMACS). Although other secure communication links and protocols may be used, from here forward the description will use the term CPDLC for the secure communication link between the air traffic control tower 166 and the aircraft 102. If the pilot desires to relinquish control of the aircraft to the air traffic controller, the pilot may make a send codes input through the send codes input device 402 (step 710). The GRCS controller 104 may generate a unique randomly chosen one time encryption number, and a confirmation code, which may be sent via CPDLC to the air traffic control tower 166 (step 712). The confirmation code may be displayed on the remote control device display 400 at the tower, and the second aircraft display unit 406 on the aircraft 102 (step 714). The air traffic control tower 166 may send the confirmation code to the aircraft 102 via CPDLC and the confirmation code may be displayed on the first display unit 404 on the aircraft 102 (step 716). If the confirmation codes agree on the first and second display units 404, 406, the pilot may contact the tower over CPDLC, or verbally over radio, and confirms that the code has been received may repeat the code (step 718). If the air traffic control tower 166 agrees that the code received verbally from the pilot matches the code displayed on the remote control device display 400, the tower may send a control enabled message via CPDLC to the pilot which may be displayed on the first aircraft display unit 404 (step 720). The pilot may then make an "on" selection with the remote control on/off selector 298 (step 722). The method 700 may continue to steps in FIG. 7B.

Figure 7B:
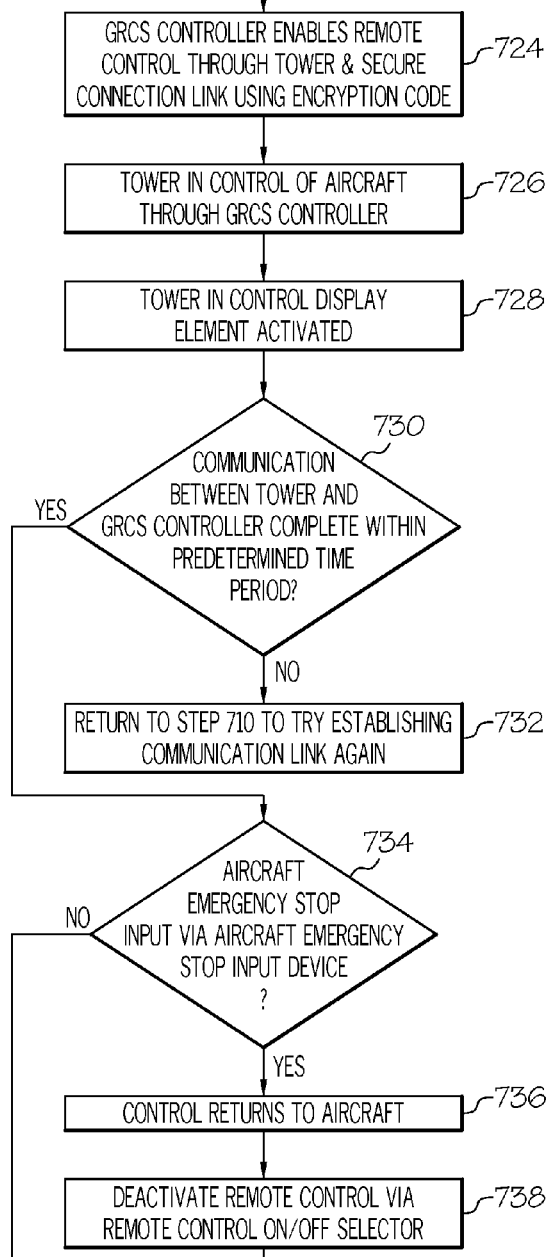
FIG. 7B is a flow chart of a second portion of a second embodiment of a ground remote control method for an aircraft with an electric taxi system according to an exemplary embodiment of the present invention.

Referring now to FIG. 7B, a second portion of a second embodiment of an exemplary ground remote control method 700 for the aircraft 102 with the ETS 118 is illustrated in a flow chart. In response to the "on" selection, the GRCS controller 104 may enable remote control of the aircraft through the air traffic control tower 166 and ROC 162 using CPDLC and the encryption code (step 724).

The air traffic controller may remotely control the aircraft 102 through the ROC 162 as described in relation to FIGS. 5A-5L (step 726). The first aircraft display unit 404 may display a message indicating that the tower is in control of the aircraft 102 (step 728). If secure communications between the GRCS controller 104 and the ROC 162 are not established within a predetermined time period after the send codes input, the GRCS controller 104 may cease the connection establishment method, and an error message may be display on the second aircraft display unit 406 (step 730). The air traffic control tower 166 and/or the pilot may begin the process again through repeating steps 710-724 (step 732).

The pilot and/or a crew member may want to bring the aircraft 102 to an emergency stop while the air traffic control tower 166 is in control of the aircraft through the ROC 162. The pilot and/or crew member may make an emergency stop input through the emergency stop input device 280 (step 734). In response to the emergency stop input, the GRCS controller 104 may return control of the aircraft 102 to the flight deck 108 and the pilot, and the aircraft 102 controls will perform an emergency stop of the aircraft 102 (step 736). The air traffic control tower 166 may desire to return control of the aircraft 102 to the flight deck 108 and pilot. In response to the request, the pilot and/or a crew member may select "off" with the remote control on/off selector 298 (step 738). The method 700 may continue to steps in FIG. 7C.

Figure 7C:
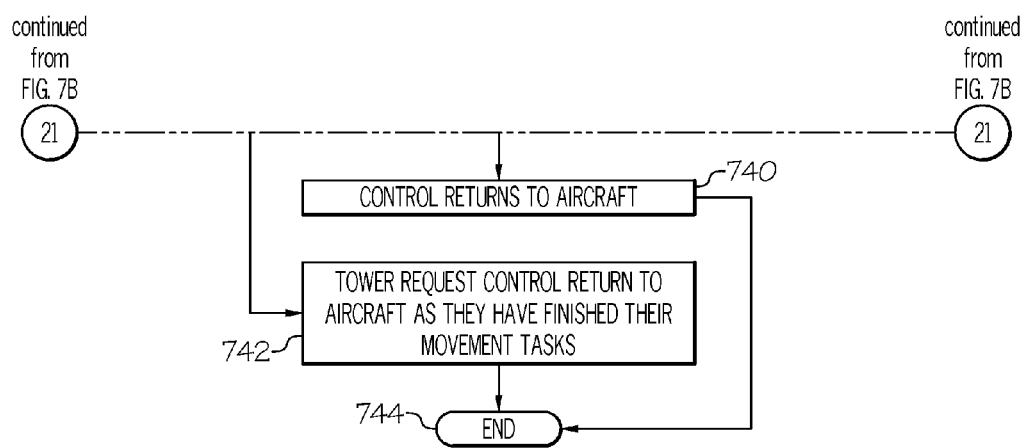
FIG. 7C is a flow chart of a third portion of a second embodiment of a ground remote control method for an aircraft with an electric taxi system according to an exemplary embodiment of the present invention.

Referring now to FIG. 7C, a third portion of a second embodiment of an exemplary ground remote control method 700 for the aircraft 102 with the ETS 118 is illustrated in a flow chart. If the pilot and/or a crew member selects the "off" position with the remote control on/off selector 298, the control may return to the flight deck 108 (step 740). Alternatively, the air traffic control tower 166 may complete their aircraft 102 movement tasks, and may request, through CPDLC for example, that control be returned to the aircraft 102 (step 7421). The method ends at step 744.

It should be understood, of course, that the foregoing relates to exemplary embodiments of the invention and that modifications may be made without departing from the spirit and scope of the invention as set forth in the following claims.

We claim:

1. A ground remote control system for an aircraft, comprising:

an electric taxi system to provide motive power to main landing gear wheels for taxiing the aircraft in response to electronic drive commands;

a braking system to slow the aircraft during taxiing with brakes on the main landing gear wheels in response to electronic brake commands;

a steering system to steer the aircraft during taxiing in response to electronic steering commands;

a security pairing device configured to establish a first secure communication link and protocol between a remote control device and a ground remote control system controller located on the aircraft; and establish a second secure communication link and protocol, using the first communication link and protocol between the remote control device and the ground remote control system controller; and an auxiliary power unit selectively connected to the electric taxi system, the braking system, and the steering system to provide power to the electric taxi system, the braking system, and the steering system; the auxiliary power unit configured to power on and power off in response to electronic power commands, the ground remote control system controller configured to receive a desired speed and direction, braking input signals, and a desired steering angle, from the remote control device, using the second secure communication link and protocol; and generate the electronic drive commands, the electronic brake commands, and the electronic steering commands, based, at least in part, on the desired speed and direction, the braking input signals, and the desired steering angle, wherein the ground remote control system controller is further configured to receive auxiliary power unit power on and power off signals from the remote control device, using the second secure communication link and protocol; and generate the electronic power commands, based, at least in part, on the auxiliary power unit power on and power off signals.

2. The remote control system of claim 1, wherein the ground remote control system controller is configured to generate a random number for encrypting signals transmitted and received through the second secure communication link and protocol.

3. The remote control system of claim 1;
further comprising an aircraft remote control user interface including a remote control selector configured to select a remote on first option or a remote off second option; and
wherein the security pairing device is configured to establish the first secure communication link and protocol between the remote control device and the ground remote control system controller when the remote on first option is selected.

4. The remote control system of claim 1;
further comprising aircraft remote control lights mounted on the aircraft and configured to power on in response to a remote control lights on command; and
wherein the ground remote control system controller is configured to generate the remote control lights on command in response to receiving a remote control lights on signal from the remote control device.

5. The remote control system of claim 1, wherein
the security pairing device is configured to establish a third secure communication link and protocol between a second remote control device and the ground remote control system controller; and establish a fourth secure communication link and protocol, using the third communication link and protocol between the second remote control device and the ground remote control system controller; and
the ground remote control system controller is configured to generate drive commands and braking commands to bring the aircraft to a stop in the shortest possible period of time in response to an emergency stop signal sent by the second remote control device using the fourth secure communication link and protocol; and generate and transmit an emergency stop display signal to the first remote control device using the second secure communication link and protocol.

6. The remote control system of claim 1, further comprising a back-up power supply electrically connected to provide power to the security pairing device, and the ground remote control system controller; and configured to selectively provide power to the auxiliary power unit in response to a power on electronic power command to start the auxiliary power unit.

7. A ground remote control method for an aircraft, comprising:
receiving a request to allow remote control of the aircraft with a remote control device;
inputting a request for a first security code and a second security code to be sent to the remote control device with an input device on the aircraft;

generating the first security code and the second security code with a ground remote control system controller on the aircraft;
displaying the first security code on a first security code display on the aircraft;
transmitting the first security code and the second security code to the remote control device through a first communication link and protocol;
receiving a confirmation security code through the first communication link and protocol;
displaying the third security code on a second security code display on the aircraft;
inputting a remote control on input through a remote control selector on the aircraft if the first security code equals the confirmation security code;
establishing a second secure communication link and protocol, between the remote control device and the ground remote control system using the second security code;
receiving with the ground remote control system controller a desired speed and direction, braking input signals, and a desired steering angle, from the remote control device, using the second secure communication link and protocol; and
generating with the ground remote control system controller electronic drive commands, electronic brake commands, and electronic steering commands, based, at least in part, on the desired speed and direction, the braking input signals, and the desired steering angle.

8. The remote control method of claim 7, wherein the first security code includes a first random number generated by the ground remote control system controller and the second security code includes a second random number generated by the ground remote control system controller.

9. The remote control method of claim 7, wherein first communication link and protocol includes a control pilot data link communications communication and protocol.

10. The remote control method of claim 7; further comprising
providing motive power to the aircraft with an electric taxi system powered by an auxiliary power unit, in response to the electronic drive commands;
slowing the aircraft with a braking system powered by an auxiliary power unit, in response to the electronic brake commands; and
steering the aircraft with a steering system powered by an auxiliary power unit, in response to the electronic steering commands.

11. The remote control method of claim 7; wherein the remote control device is located at an air traffic control tower.

12. A ground remote control system for an aircraft, comprising:
an air conditioning system configured to turn on and turn off in response to electronic air conditioning system power commands;
a heating system configured to turn on and turn off in response to electronic heating system power commands;
an auxiliary power unit selectively connected to the air conditioning system and the heating system to provide power to the air conditioning system and the heating system; the auxiliary power unit configured to power on and power off in response to electronic power commands; and
a security pairing device configured to establish a first secure communication link and protocol between a remote control device and a ground remote control system controller; and establish a second secure communication link and protocol, using the first communication link and protocol between the remote control device and the ground remote control system controller;

the ground remote control system controller configured to receive auxiliary power unit power on and power off signals, and an aircraft ready input from the remote control device, using the second secure communication link and protocol; and generate the air conditioning system power commands, the heating system power commands, based, at least in part, on the auxiliary power unit power on and power off signals, and the aircraft ready input.

13. The remote control system of claim 12; wherein the security pairing device includes a first light emitting diode modem configured to establish the first secure communication link and protocol with a second light emitting diode modem of the remote control device.

14. The remote control system of claim 13, wherein:

the security pairing device includes a co-located input device configured to allow a user to input a co-located input when the remote control device is within a predetermined distance from the security pairing device, and to generate a co-located signal; and the first light emitting diode modem is activated in response to the co-located signal.

15. The remote control system of claim 12, wherein:

the remote control device includes a phone number input device configured to allow a user to input a return phone number;

the ground remote control system controller is configured to receive the return phone number using the first secure communication link and protocol, and store the return phone number;

the ground remote control system controller is configured to generate a first security code and send the first security code to the remote control device for display to the user, using the first secure communication link and protocol;

the security pairing device is configured to establish the second secure communication link and protocol in response, at least in part, to receiving a communication including the first security code from a phone with the return phone number.

16. The remote control system of claim 12, wherein:

the remote control device includes a communication channel link;

the ground remote control system controller is configured to receive the communication channel link, using the first secure communication link and protocol, and store the communication channel link;

the security pairing device is configured to establish the second secure communication link and protocol between the ground remote control system controller and the remote control device through the communication channel link.

17. The remote control system of claim 16; wherein the communication channel link includes a cellular phone number.

18. The remote control system of claim 12; further comprising a temperature control system configured to control the air conditioning system or the heat system to maintain a desired temperature in at least one section of the aircraft in response to a temperature command signal indicative of the desired temperature;

wherein the remote control device includes a desired temperature input device configured to allow a user to input the desired temperature, and to generate a desired temperature signal indicative of the desired temperature;

wherein the ground remote control system controller is configured to receive the desired temperature signal, and responsively generate the temperature command signal.

\* \* \* \* \*